(12) United States Patent
Hein et al.

(10) Patent No.: US 11,836,466 B2
(45) Date of Patent: Dec. 5, 2023

(54) RESIDUE NUMBER SYSTEM IN A PHOTONIC MATRIX ACCELERATOR

(71) Applicant: Lightmatter, Inc., Boston, MA (US)

(72) Inventors: Eric Hein, Atlanta, GA (US); Ayon Basumallik, Framingham, MA (US); Nicholas C. Harris, Boston, MA (US); Darius Bunandar, Boston, MA (US); Cansu Demirkiran, Brookline, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 17/543,676

(22) Filed: Dec. 6, 2021

(65) Prior Publication Data
US 2022/0229634 A1 Jul. 21, 2022

Related U.S. Application Data

(60) Provisional application No. 63/253,999, filed on Oct. 8, 2021, provisional application No. 63/122,329, filed on Dec. 7, 2020.

(51) Int. Cl.
*G06F 7/72* (2006.01)
*G06E 1/00* (2006.01)

(52) U.S. Cl.
CPC ............... *G06F 7/729* (2013.01); *G06E 1/00* (2013.01)

(58) Field of Classification Search
CPC . G06F 7/72; G06F 7/722; G06F 7/724; G06F 7/727; G06F 7/729; G06E 3/00–008; G06E 1/00–065
See application file for complete search history.

(56) References Cited

U.S. PATENT DOCUMENTS

| | | | | |
|---|---|---|---|---|
| 4,566,077 A | * | 1/1986 | Schuocker | G06E 1/065 708/835 |
| 4,567,355 A | * | 1/1986 | Schuoecker | H03M 7/04 356/519 |
| 4,910,699 A | | 3/1990 | Capps et al. | |

(Continued)

FOREIGN PATENT DOCUMENTS

TW I735886 B * 8/2021 ............. G06N 3/067

OTHER PUBLICATIONS

G. Mitterer et al., Optical Adder for Residue Numbers, Applied Physics B 46, 125-130, 1998 (Year: 1998).*

(Continued)

*Primary Examiner* — Emily E Larocque
(74) *Attorney, Agent, or Firm* — Wolf, Greenfield & Sacks, P.C.

(57) ABSTRACT

A photonic processor uses light signals and a residue number system (RNS) to perform calculations. The processor sums two or more values by shifting the phase of a light signal with phase shifters and reading out the summed phase with a coherent detector. Because phase winds back every $2\pi$ radians, the photonic processor performs addition modulo $2\pi$. A photonic processor may use the summation of phases to perform dot products and correct erroneous residues. A photonic processor may use the RNS in combination with a positional number system (PNS) to extend the numerical range of the photonic processor, which may be used to accelerate homomorphic encryption (HE)-based deep learning.

20 Claims, 11 Drawing Sheets

(56) References Cited

U.S. PATENT DOCUMENTS

| 6,148,034 A | 11/2000 | Lipovski |
| 2015/0339103 A1 | 11/2015 | Olsen |
| 2018/0336015 A1 | 11/2018 | Roetteler et al. |
| 2020/0250532 A1 | 8/2020 | Shen et al. |
| 2022/0094517 A1* | 3/2022 | Ghosh .................. H04L 9/0618 |

OTHER PUBLICATIONS

D. Psaltis et al., Optical residue arithmetic: a correlation approach, Applied Optics, vol. 18, No. 2, 1979 (Year: 1979).*

International Search Report and Written Opinion dated Feb. 16, 2022 in connection with International Application No. PCT/US2021/062080.

* cited by examiner

Table VI

RESIDUE NUMBER SYSTEM IN A PHOTONIC MATRIX ACCELERATOR

CROSS REFERENCE TO RELATED APPLICATIONS

This application claims priority under 35 U.S.C. § 119(e) to U.S. Provisional Application Ser. No. 63/253,999, filed Oct. 8, 2021, and titled "EXTENDING RESIDUE NUMERAL SYSTEM IN A MATRIX ACCELERATOR WITH POSITIONAL NUMERAL SYSTEM", which is hereby incorporated herein by reference in its entirety.

This application claims priority under 35 U.S.C. § 119(e) to U.S. Provisional Application Ser. No. 63/122,329, filed Dec. 7, 2020, and titled "RESIDUE NUMBER SYSTEM IN A PHOTONIC MATRIX ACCELERATOR", which is hereby incorporated herein by reference in its entirety.

FIELD OF THE DISCLOSURE

The disclosure is generally related to photonic processors.

BACKGROUND OF INVENTION

Conventional electronic computer processors may face power and/or speed limitations due to power dissipation.

SUMMARY OF INVENTION

According to aspects of the application, there is provided a photonic linear processor. The photonic linear processor comprises at least one light source and at least one amplitude modulator configured to provide a first value associated with a first modulus and provide a second value associated with the first modulus. The photonic linear processor comprises at least one phase shifter configured to shift, by each of the first value and the second value, a phase of a first light signal. The photonic linear processor comprises at least one coherent receiver configured to detect the shifted phase of the first light signal and output the detected phase of the first light signal as representing a first residue of a sum of the first value and the second value, the first residue being associated with the first modulus.

In some embodiments, the at least one light source and at least one amplitude modulator are further configured to provide a first vector comprising a first ordered sequence of value, provide a second vector comprising a second ordered sequence of values of equal length as the first ordered sequence of values, represent the first vector as a tuple of residue vectors, each residue vector of the tuple of residue vectors comprising a respective third ordered sequence of values of equal length as the first ordered sequence of values and each residue vector being associated with a respective modulus of a plurality of moduli of a residue number system, wherein the plurality of moduli includes the first modulus, and for each residue vector of the tuple of residue vector, multiply corresponding values of the first ordered sequence of values and the respective third ordered sequence of values to produce a plurality of products, wherein the plurality of products for a first residue vector of the plurality of residue vectors includes the first value and the second value. The at least one phase shifter is further configured to, for each residue vector of the tuple of residue vectors, shift, by each product of the plurality products, a phase of a light signal, wherein a light signal for the first residue vector comprises the first light signal. The at least one coherent receiver is further configured to detect the shifted phase of the light signal and output the detected phases of the light signals as a tuple of residues, the tuple of residues representing a dot product of the first vector and the second vector, wherein one residue of the tuple comprises the first residue of the sum of the first value and the second value associated with the first modulus In some embodiments, the residue number system comprises a redundant residue number system, the redundant residue number system comprises the plurality of moduli and at least one redundant modulus, and the photonic linear processor is further configured to, using the at least one redundant modulus detect an erroneous residue and correct the erroneous residue.

In some embodiments, the photonic linear processor is further configured to represent a number using a combination of a residue number system (RNS) and a positional number system (PNS), comprising representing the number using a plurality of digits of the PNS and representing each digit of the plurality of digits using a plurality of residues, wherein each residue of the plurality of residues represents a remainder of a digit of the plurality of digits with respect to a modulus of the plurality of moduli of the RNS and obtain at least one of the first value and the second value using at least one residue of the plurality of residues.

In some embodiments, the photonic linear processor is further configured to detect an overflow of a first digit of the plurality of digit and propagate the overflow from the first digit to a second digit, wherein the second digit has a higher order than the first digit.

In some embodiments, the plurality of moduli comprises a first set of moduli, the first set of moduli is configured to represent each digit of the plurality of digits, the plurality of moduli further comprises a second set of moduli, each modulus of the second set of moduli is different than each modulus of the first set of moduli, the second set of moduli includes the first modulus, and detecting the overflow of the first digit comprises detecting the overflow of the first digit using the outputted detected phase of the light signal representing the residue of the sum of the first value and the second value, associated with the first modulus.

In some embodiments, the at least one coherent receiver is configured with at least $\log_2(m_i)$ bits of precision, wherein $m_i$ is the first modulus.

In some embodiments, the photonic linear processor further comprises an 8-bit analog-to-digital converter (ADC), wherein the at least one coherent receiver configured to output the detected phase to the ADC.

According to aspects of the disclosure, there is provided a method of performing summation of values using phases of light. The method comprises providing a first value associated with a first modulus, providing a second value associated with the first modulus, using at least one phase shifter, shifting, by each of the first value and the second value, a phase of a light signal, using at least one coherent receiver, detecting the shifted phase of the light signal, and outputting the detected phase of the light signal as representing a first residue of a sum of the first value and the second value, the first residue being associated with the first modulus.

In some embodiments, the method further comprises providing a first vector comprising a first ordered sequence of values, providing a second vector comprising a second ordered sequence of values of equal length as the first ordered sequence of values, representing the first vector as a tuple of residue vectors, each residue vector of the tuple of residue vectors comprising a respective third ordered sequence of values of equal length as the first ordered sequence of values and each residue vector being associated with a respective modulus of a plurality of moduli of a residue number system, wherein the plurality of moduli includes the first modulus, for each residue vector of the tuple of residue vectors, multiplying corresponding values of the first ordered sequence of values and the respective third ordered sequence of values to produce a plurality of products, wherein the plurality of products for a first residue vector of the plurality of residue vectors includes the first value and the second value, using at least one phase shifter, shifting, by each product of the plurality products, a phase of a light signal, wherein a light signal for the first residue vector comprises the first light signal, and using at least one coherent receiver, detecting the shifted phase of the light signal, and outputting the detected phases of the light signals as a tuple of residues, the tuple of residues representing a dot product of the first vector and the second vector, wherein one residue of the tuple comprises the first residue of the sum of the first value and the second value associated with the first modulus In some embodiments, the method of claim further comprises converting the first vector to the tuple of residue vectors using constant factors of $2\pi/m_i$, wherein $m_i$ comprises the respective modulus.

In some embodiments, the method further comprises converting the result vector from phase space to a tuple of integer residues using constant factors of $2\pi/m_i$, wherein $m_i$ comprises the respective modulus.

In some embodiments, the method further comprises converting the tuple of integer residues to an integer.

In some embodiments, converting the tuple of integer residues to the integer comprises converting the tuple of integer residues to the integer using Chinese Remainder Theorem.

In some embodiments, the method further comprises, to perform signed addition, for integer residues of the tuple of integer residues associated with an even modulus, adding a correction factor of M/2 to produce corrected integer residues, converting the tuple of corrected integer residues to an integer, and subtracting the correction factor of M/2 from the integer, wherein M comprises the range of the residue number system, comprising the product of each modulus of a plurality of moduli.

In some embodiments, the residue number system comprises a redundant residue number system, the redundant residue number system comprises the plurality of moduli and at least one redundant modulus, and the method further comprises, using the at least one redundant modulus detecting an erroneous residue and correcting the erroneous residue.

In some embodiments, the method further comprises representing a number using a combination of a residue number system (RNS) and a positional number system (PNS), comprising representing the number using a plurality of digits of the PNS and representing each digit of the plurality of digits using a plurality of residues, wherein each residue of the plurality of residues represents a remainder of a digit of the plurality of digits with respect to a modulus of the plurality of moduli of the RNS and obtaining at least one of the first value and the second value using at least one residue of the plurality of residues.

In some embodiments, the method further comprises detecting an overflow of a first digit of the plurality of digits and propagating the overflow from the first digit to a second digit, wherein the second digit has a higher order than the first digit.

In some embodiments, the plurality of moduli comprises a first set of moduli, the first set of moduli is configured to represent each digit of the plurality of digits, the plurality of moduli further comprises a second set of moduli, each modulus of the second set of moduli is different than each modulus of the first set of moduli, the second set of moduli includes the first modulus, and detecting the overflow of the first digit comprises detecting the overflow of the first digit using the outputted detected phase of the light signal representing the residue of the sum of the first value and the second value, associated with the first modulus.

In some embodiments, the method further comprises receiving, at a cloud server, from a client device, encrypted client data, obtaining the first value and the second value using the encrypted client data, and outputting, to the client device, from the cloud server, an encrypted result based on the detected phase.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear. In the drawings.

DETAILED DESCRIPTION OF INVENTION

Figure 1:
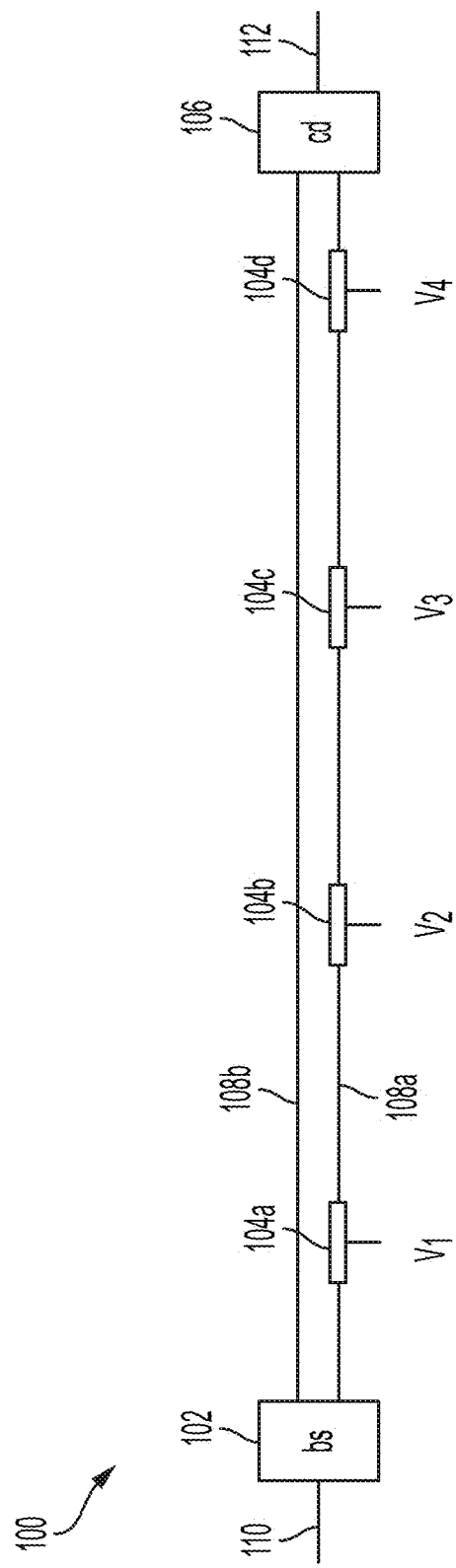
FIG. 1 illustrates components of a photonic processor.

A photonic processor uses light signals and a residue number system (RNS) to perform calculations. The processor sums two or more values by shifting the phase of a light signal with phase shifters and reading out the summed phase with a coherent detector. Because phase winds back every $2\pi$ radians, the photonic processor performs addition modulo $2\pi$. A photonic processor may use the summation of phases to perform dot products and correct erroneous residues. A photonic processor may use the RNS in combination with a positional number system (PNS) to extend the numerical range of the photonic processor, which may be used to accelerate homomorphic encryption (HE)-based deep learning.

The disclosure provides a photonic matrix accelerator implementing a residue number system (RNS). Implementing an RNS within a photonic matrix accelerator may provide the ability to compose higher precision matrix-vector multiplications from lower precision multiplications and the ability to perform error correction on a noisy analog matrix accelerator.

The inventors have recognized and appreciated that using optical signals instead of, or in combination with electrical signals, may overcome power and/or speed limitations of conventional electronic computers. When computing with optical signals, little to no power may be dissipated by increasing the distance traveled by the light signals, which may provide for new topologies and processor layouts that are not be feasible using conventional electrical signals. Photonic processors may therefore offer increased efficiency performance compared with conventional electronic computers.

The inventors have further recognized and appreciated that because a photonic matrix processor is fundamentally an analog processor, a photonic matrix processor may present design considerations. First, photonic matrix processors internally may not be able to operate on floating-point numbers, which may limit dynamic range and precision of calculations performed by the processor. Second, a read-out analog-to-digital converter of the processor (ADC) may not have enough bit precision to capture all the information within a calculation. For example, for a matrix vector multiplication M·x=y, the ADC may not satisfy the inequality of Equation 1.

$$\log_2 N + b_x + b_M - 1 \leq b_y \tag{1}$$

Equation 1 states that the output bit precision $b_y$ is sufficient to read the entire information of a calculation. The calculation information is composed of the bit precision of the vector modulators, $b_x$, and the bit precision of the matrix modulators, $b_M$. The $-1$ in Equation 1 is provided because an input vector, a matrix, and an output vector are signed numbers. If Equation 1 is not satisfied, then the output ADC will only read out the upper $b_y$ most significant bits (MSBs), and it may not be possible to build arbitrary precision calculations, for example, using the grade-school multiplication and addition algorithms, within the direct fixed-point number representation.

In some embodiments, a matrix operation may be a matrix multiplication. The matrix multiplication may comprise a segment of another operation. In some cases, training of machine learning model may involve tensor operations with tensors of order greater than 2. Some embodiments may perform tensor operations by performing matrix operations using matrices obtained from a tensor. For example, a system may obtain matrix slices from a tensor, and perform the matrix operation one matrix slice at a time. Accordingly, matrix operations described herein may be used to perform tensor operations such as tensor multiplications.

Some embodiments described herein address all the above-described issues that the inventors have recognized with conventional systems. However, it should be appreciated that not every embodiment described herein addresses every one of these issues. It should also be appreciated that embodiments of the technology described herein may be used for purposes other than addressing the above-discussed issues. Example embodiments are described herein using a neural network as an example machine learning model. However, some embodiments may be used to train and perform inference with other machine learning models. For example, some embodiments may be used to train and perform inference with a support vector machine (SVM), a logistic regression model, a linear regression model, or other suitable machine learning model to a target device. Some embodiments may be used for any machine learning model in which training and/or inference involve performance of a matrix operation.

The inventors have further recognized and appreciated that photonic processors may be susceptible to noise. Noise may arise in a photonic processor due to a variety of fundamental physical mechanisms, for example, thermal, for example, Johnson-Nyquist, noise and shot noise. These fundamental challenges can spoil the accuracy of the numerical calculations performed by a photonic processor.

Provided are methods of representing numbers within a photonic processor to address the challenges described. The inventors have recognized and appreciated that performing addition with phases, which wind back every $2\pi$ radians or 360 degrees, may provide for a residue number-based calculation within a photonic processor. By representing numbers using a residue number system (RNS), an output ADC may be forced to read out the least significant bits (LSBs) rather than MSBs. Forcing an output ADC to read out the LSBs may provide arbitrary precision calculation even when Equation 1 is not satisfied. In addition, an RNS may use a set of numbers to represent a single integer or fixed-point number. Using the RNS may further provide for an error correction code in addition to the set of numbers to correct or detect an error in calculations.

Aspects of the disclosure relate to performing summation using phases. FIG. 1 shows components 100 of a photonic processor. The components 100 include beam splitter 102 having an input 110, phase shifters 104a-104d, coherent detector 106 having output 112, and photonic paths 108a-108b. Beam splitter 102 may transmit a light signal to the coherent detector 106 using at least one of the photonic paths 108a-108b. A control signal, for example, a voltage, may be applied to each phase shifter to modulate the phase of the light signal. Components 100 are illustrated as include four columns of phase shifters but may include any number of columns of phase shifters.

FIG. 1 shows a method of performing summation of values using phases of light. FIG. 1 shows a single-ended configuration for imparting a phase shift between two photonic paths that are coherently detected. Adding two values $v_1$ and $v_2$ may be performed by modulating the phase of a single mode of light signal with $\varphi_1(v_1)$ and then $\varphi_2(v_2)$. For example, phase shifter 104a may modulate the phase of the light signal according to the value $v_1$ while phase shifter 104b may modulate the phase of the light signal according to the value $v_2$. Performing the modulation converts the electromagnetic field of the light signal $E_S$ to $E_S e^{i\varphi_1(v_1)} e^{i\varphi_2(v_2)} = E_S e^{i[\varphi_1(v_1)+\varphi_2(v_2)]}$ with respect to a reference light, for example, a local oscillator. The modulated phase can then be read out using coherent receiver modules, such as coherent receiver 106. Coherent receiver modules may use a homodyne or a heterodyne detection scheme.

Figure 2:
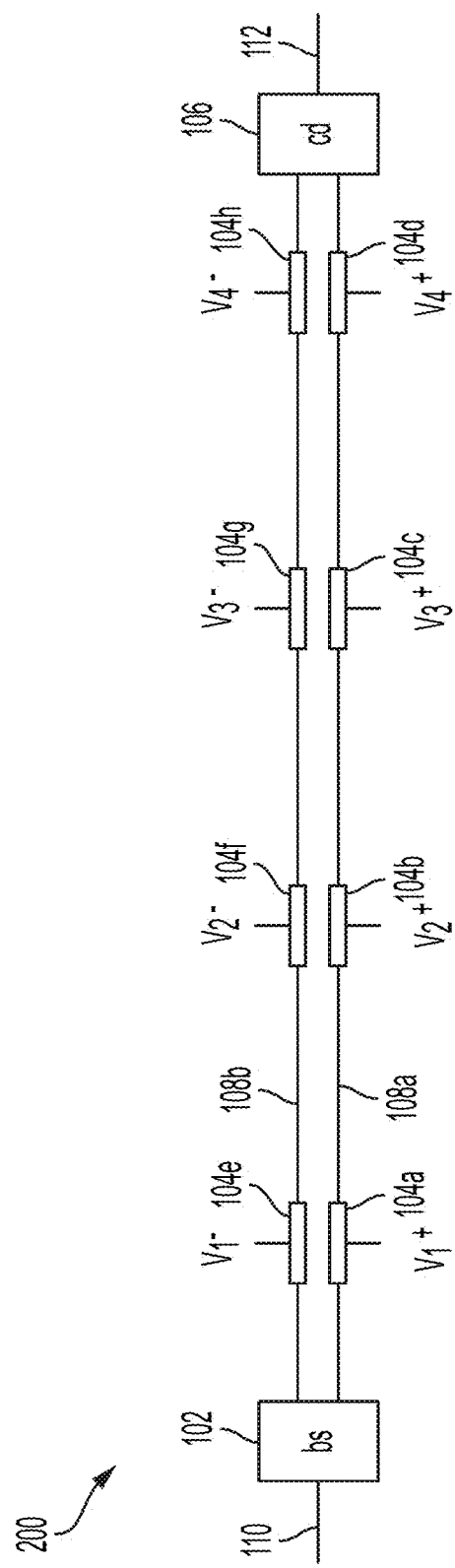
FIG. 2 illustrates components of a photonic processor.

FIG. 2 shows an alternative arrangement of components 200 of a photonic processor. FIG. 2 shows a differential configuration for imparting a phase shift between two photonic paths that are coherently detected. Components 200 differ from components 100 of FIG. 1 in that components 200 further include phase shifters 104e-104h. Furthermore, in the configuration illustrated by FIG. 2, phase shifters 104a-104h may apply phase differentially. Applying phase differentially may reduce an amount of phase that may be imparted on any single mode light.

Figure 3:
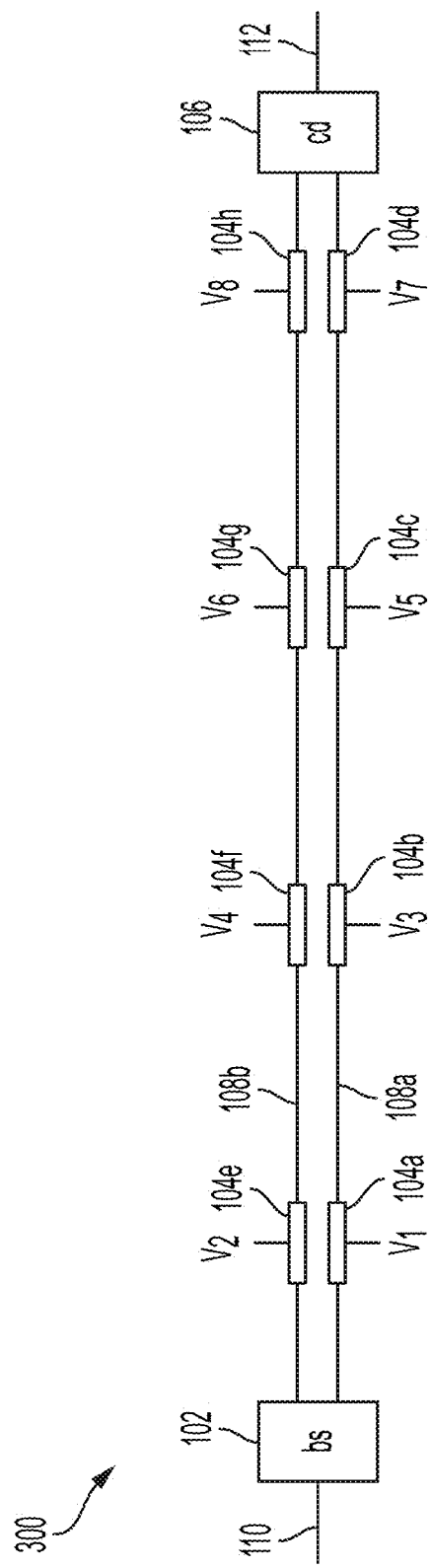
FIG. 3 illustrates components of a photonic processor.

FIG. 3 shows an alternative arrangement of components 300 of a photonic processor. FIG. 3 shows a single-ended configuration where voltages are applied on different phase shifters of different photonic paths to obtain a sign for imparting a phase shift between the two photonic paths that are coherently detected. Components 300 differ from components 200 of FIG. 2 in that components 300 apply phase on both photonic paths 108a-108b independently, which may allow for additions with signed numbers even when a phase shifter may only apply positive phases on each arm.

Figure 4:
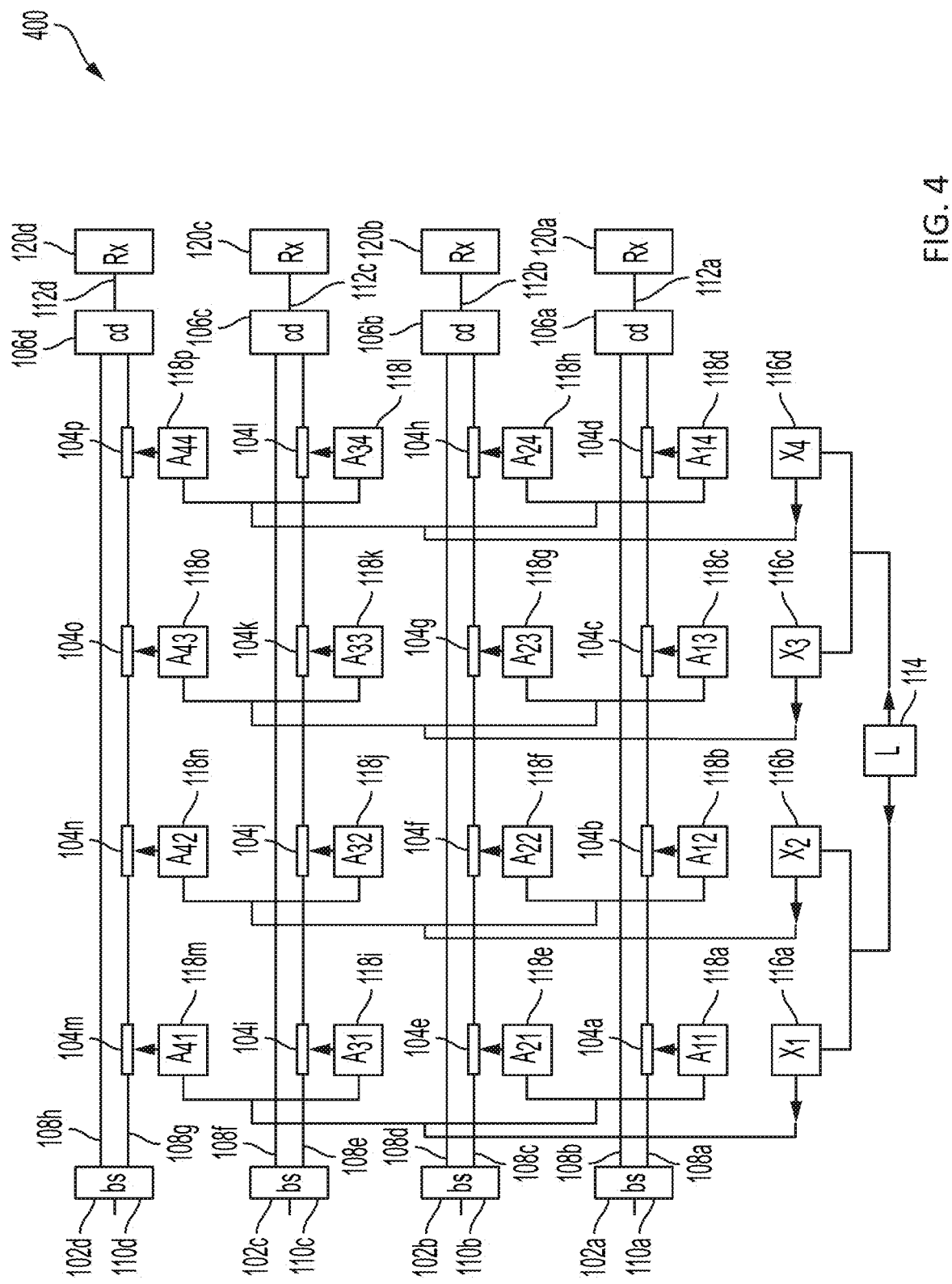
FIG. 4 illustrates a photonic processor.

FIG. 4 shows a linear photonic matrix processor 400 configured to perform phase-based summation of values.

Processor 400 is illustrated as including the components 100 of FIG. 1 as a first row, and additionally includes three other rows of components. However, processor 400 may include any number of rows of components. In addition, processor 400 may instead include rows of components 200 of FIG. 2 or components 300 of FIG. 3. As shown in FIG. 4, the processor 400 includes include beam splitters 102a-102d having respective inputs 110a-110d, phase shifters 104a-104p, coherent detectors 106a-106d having outputs 112a-112d, and photonic paths 108a-108h. The processor 400 further comprises laser 114, amplitude modulators 116a-116d, and optical-to-electronic weight modulators 118a-118p. Light may be transmitted from the laser 114 to the set of amplitude modulators 116a-116d, which may be labeled $x_n$. The amplitude modulators 116a-116d may then transmit modulated light signals the optical-to-electronic weight modulators 118a-118p, which may be labeled $A_{mn}$. The optical-to-electronic weight modulators 118a-118p may detect the modulated light signals. The optical-to-electronic weight modulators 118a-118p may then electrically or optically modulate the signals and drive each respective phase shifter 104a-104p. The paths between the laser 114 and the amplitude modulators 116a-116d, between the amplitude modulators 116a-116d and the optical-to-electronic weight modulators 118a-118p, and between the beam splitters 102a-102d, phase shifters 104a-104p, and coherent detectors 106a-106d may be photonic. The paths between the optical-to-electronic weight modulators 118a-118p and the phase shifters 104a-104p may be electrical. The coherent detectors 106a-106d may provide an output to receivers 120a-120d, which may each comprise a transimpedance amplifier and an ADC.

Aspects of the disclosure may relate to a residue number system (RNS). A residue number system may use a set of n moduli which are pairwise relatively prime or coprime. A range of representable values is the product of each of the moduli. Any number in the range may be uniquely represented by a tuple of residues, corresponding to each modulus. Such an RNS may be closed under addition and multiplication.

The inventors have recognized and appreciated that within a photonic matrix processor, matrix multiplication may be composed of dot products between an input vector $\vec{x}$ and a row vector from the programmed matrix $\vec{A_{i,:}}$, where i labels the row. The disclosure describes applying an RNS in a dot product when using phases for the summation.

An exemplary residue number system can be constructed using n=4 moduli shown in Equation 2.

$$m_1=2, m_2=3, m_3=5, m_4=7. \quad (2)$$

Each of the moduli is coprime with one another, for example, the greatest common divisor between each of the two numbers is 1. The range of an RNS is the product of all the moduli according to Equation 3.

$$M=\Pi_{i=1}^{n} m_i=210 \quad (3)$$

All integers from 0 to M−1 have a unique representation as a tuple of residues. For example, the integer 9 can be uniquely represented by a tuple (9 mod 2  9 mod 3  9 mod 5  9 mod 7)=(1 0 4 2).

As an additional example, 11 may be represented by the tuple (1 2 1 4). A sum may be computed by performing pairwise addition of the tuples, and performing a modulo the corresponding modulus as in Equations 4-6.

$$(1042) \Leftrightarrow 9 \quad (4)$$

$$+(1214) \Leftrightarrow 11 \quad (5)$$

$$=(0206) \Leftrightarrow 20 \quad (6)$$

In the example, each of the residue inputs and outputs may be performed with 3-bit arithmetic. The numbers between 0 and 7 are to be captured. In contrast, the integer numbers that this set of output residues encode would use 8 bits to represent.

As shown in the example, precision may be built up using the RNS. As another example, choosing $m_1=199$, $m_2=233$, $m_3=194$, $m_4=239$ creates an RNS with a range of M=2,149,852,322. Each of these residues can be represented using 8 bits, while the range of integers is greater than $2^{31}$ and would be represented by 32 bits. Reading an optical signal with a 32-bit ADC at gigahertz bandwidth may be use high precision and consume large amounts of power. The RNS may allow the same output to be obtained using multiple 8-bit ADCs that use less precision and consumer smaller amounts of power at gigahertz bandwidth.

Summing values using phases, which wind back every $2\pi$ radians, may reduce or eliminate use of specialized hardware to perform modulo arithmetic. For example, if a phase of a beam of light is shifted by $2\pi$ radians along one path, and not shifted at all along the other path, the two beams will be detected as being in phase at the detector. In effect, operations performed in this phase space may be considered to be mod-$2\pi$ arithmetic. As an example, if a phase shift of $\pi/2$ is applied five times in succession, the resulting phase shift is $$\frac{\pi}{2}$$

because $$\frac{5\pi}{2}$$

mod $$2\pi = \frac{\pi}{2}.$$

According to one example, vectors may each comprise an equal length ordered sequence of four values. In the example, each value may be represented using four residues each. In the example, vectors are presented using brace notation [ ] and tuples of residues are represented using parenthesis ( ).

A vector dot product may be computed using phase summation within a photonic processor such as processor 400. For example, a vector dot product A·x may be computed where A=[6, 7, 8, 9] and x=[1, 2, 3, 4]. The example may use n=4 moduli, $m_1=2$, $m_2=3$, $m_3=5$, =7, with $M=\Pi_{i=1}^{n} m_i=210$.

To perform the modular arithmetic mod $m_i$ in phase space, the values of A are pre-multiplied by a constant factor $$\frac{2\pi}{m_i}.$$

The constant factor is used to convert the integer space moduli to phase space moduli. The pre-multiplication produces a tuple of vectors, one for each modulus in the RNS, shown in Equations 7-12.

$$A = [6 \quad 7 \quad 8 \quad 9] \tag{7}$$

$$A_{m_i} = A \times \frac{2\pi}{m_i} \tag{8}$$

$$A_2 = \left[\frac{12\pi}{2} \frac{14\pi}{2} \frac{16\pi}{2} \frac{18\pi}{2}\right] \tag{9}$$

$$A_3 = \left[\frac{12\pi}{3} \frac{14\pi}{3} \frac{16\pi}{3} \frac{18\pi}{3}\right] \tag{10}$$

$$A_5 = \left[\frac{12\pi}{5} \frac{14\pi}{5} \frac{16\pi}{5} \frac{18\pi}{5}\right] \tag{11}$$

$$A_7 = \left[\frac{12\pi}{7} \frac{14\pi}{7} \frac{16\pi}{7} \frac{18\pi}{7}\right] \tag{12}$$

The vector modulators, such as amplitude modulators 116a-116d, are driven according to the values of the input vector x. The resulting output signals of the vector modulators are fed into the array of weight modulators, such as optical-to-electronic weight modulators 118a-118p, and sixteen analog multiplications are performed in parallel by the array of weigh modulators. The output of each weight modulator drives the attached phase shifter, for example, the phase shifters 104a-104p. Light signals, for example, from beam splitters 102a-102d, pass through the chain of phase shifters in each row, and the resulting phase shift is detected by coherent receivers such as coherent receivers 106a-106d. Detecting the phase shift, which winds back every $2\pi$ radians, effectively performing addition modulo $2\pi$ of each phase shift in a row. The set of results at the detectors comprises is a tuple of residues in the phase space.

A coherent receiver in such a configuration is configured to distinguish between $m_i$ unique phase shifts. For example, in the row that has been assigned the modulus 5, possible detected phases at the receiver are $$\left\{0, \frac{2\pi}{5}, \frac{4\pi}{5}, \frac{6\pi}{5}, \frac{8\pi}{5}\right\}.$$

The ADC in each row may be configured with at least $\log_2(m_i)$ bits of precision. Equations 13-17 show the modulo addition for the dot product performed.

$$x = [1 \quad 2 \quad 3 \quad 4] \tag{13}$$

$$A_2 \cdot x = \left[\frac{12\pi}{2} + \frac{28\pi}{2} + \frac{48\pi}{2} + \frac{60\pi}{2}\right] \bmod 2\pi = 0 \tag{14}$$

$$A_3 \cdot x = \left[\frac{12\pi}{3} + \frac{28\pi}{3} + \frac{48\pi}{3} + \frac{60\pi}{3}\right] \bmod 2\pi = \frac{4\pi}{3} \tag{15}$$

$$A_5 \cdot x = \left[\frac{12\pi}{5} + \frac{28\pi}{5} + \frac{48\pi}{5} + \frac{60\pi}{5}\right] \bmod 2\pi = \frac{8\pi}{5} \tag{16}$$

$$A_7 \cdot x = \left[\frac{12\pi}{7} + \frac{28\pi}{7} + \frac{48\pi}{7} + \frac{60\pi}{7}\right] \bmod 2\pi = \frac{8\pi}{7} \tag{17}$$

The residues in the phase space may be converted from phase space back into integer residues using the constant factor. Multiplying the residues by $$\frac{m_i}{2\pi}$$

to is shown in Equation 18.

$$\left(0 \quad \frac{4\pi}{3} \quad \frac{8\pi}{5} \quad \frac{8\pi}{7}\right) \times \left(\frac{2}{2\pi} \quad \frac{3}{2\pi} \quad \frac{5}{2\pi} \quad \frac{7}{2\pi}\right) = (0 \quad 2 \quad 4 \quad 4) \tag{18}$$

The tuple of residues may then be converted into an integer. For example, a tuple of residues may be converted to an integer using the Chinese Remainder Theorem (CRT) shown in Equation 19. Other ways of converting residues to an integer may be used.

$$\left(\sum_{i=1}^{n} r_i \frac{M}{m_i} Y_i\right) \bmod M, \tag{19}$$

In Equation 21, $r_i$ is the i-th residue in the tuple, and $Y_i$ is the modular multiplicative inverse of $$\frac{M}{m_i}$$

with respect to $m_i$. $Y_i$ is an integer such that the product $Y_i \cdot (m/m_i)$ is congruent to 1 with respect to $m_i$, i.e., $Y_i \cdot$ $$\frac{M}{m_i} \equiv 1$$

mod $m_i$. In the described example, $Y_2=1, Y_3=1, Y_5=3, Y_7=4$.

For example, CRT may be applied to the integer residues of (0 2 4 4) in Equation 20.

$$(0\times105\times1+2\times70\times1+4\times3\times42+4\times4\times30) \bmod 210 = 74 \tag{20}$$

An 8-bit result equal to the result in the example is obtained when using ordinary arithmetic in Equation 21.

$$[6,7,8,9][1,2,3,4] = 6+14+24+36 = 74 \tag{21}$$

Aspects of the disclosure may also provide signed arithmetic in a residue number system. The preceding example describes calculations performed using unsigned numbers. A residue number system may also represent signed numbers by encoding with an offset of $$\frac{M}{2}.$$

Thus, the signed version of the RNS in the examples described above, for example, with $m_1=2$, $m_2=3$, $m_3=5$, $m_4=7$, may represent numbers in the range $[-105, 104]$.

A signed RNS may use a correction factor, added after each operation. For signed addition, a correction factor is $$\frac{M}{2}$$

for even moduli, and 0 for odd moduli. The correction factor may be applied after each addition. Because $\forall i: M \bmod m_i = 0$, the correction factors for an even number of additions may cancel each other out. For a row line with an even number of phase shifters, an odd number of additions is performed, a final correction factor is $$\frac{M}{2}$$

for each even modulus. This correction may be applied when converting from phase space back to integer residues, or by applying a phase bias in a coherent receiver.

According to one example, a vector dot product $A \cdot x$ is computed where $A=[2, -5, -9, 4]$ and $x=[4, -2, 1, -3]$. First, values of $A$ are pre-multiplied by the constant factor $$\frac{2\pi}{m_i}$$

as shown in Equations 22-27. Negative values may be used because the phase shifters in this example are configured to receive positive or negative voltages as inputs.

$$A = [2 \quad -5 \quad -9 \quad 4] \tag{22}$$

$$A_{m_i} = A \times \frac{2\pi}{m_i} \tag{23}$$

$$A_2 = \left[\frac{4\pi}{2} \quad \frac{-10\pi}{2} \quad \frac{-18\pi}{2} \quad \frac{8\pi}{2}\right] \tag{24}$$

$$A_3 = \left[\frac{4\pi}{3} \quad \frac{-10\pi}{3} \quad \frac{-18\pi}{3} \quad \frac{8\pi}{3}\right] \tag{25}$$

$$A_5 = \left[\frac{4\pi}{5} \quad \frac{-10\pi}{5} \quad \frac{-18\pi}{5} \quad \frac{8\pi}{5}\right] \tag{26}$$

$$A_7 = \left[\frac{4\pi}{7} \quad \frac{-10\pi}{7} \quad \frac{-18\pi}{7} \quad \frac{8\pi}{7}\right] \tag{27}$$

The vector $x$ may be encoded in terms of the amplitude or the intensity of the laser. Therefore, a vector $x_+$ may be used to make each value positive, where $$x_+ = x + \frac{M}{2}.$$

Equations 28-33 show the modulo addition for the dot product performed.

$$x = [4 \quad -2 \quad 1 \quad -3] \tag{28}$$

$$x_+ = [109 \quad 103 \quad 106 \quad 102] \tag{29}$$

$$A_2 \cdot x_+ = \left[\frac{436\pi}{2} + \frac{-1030\pi}{2} + \frac{-1908\pi}{2} + \frac{816\pi}{2}\right] \bmod 2\pi = \pi \tag{30}$$

$$A_3 \cdot x_+ = \left[\frac{436\pi}{3} + \frac{-1030\pi}{3} + \frac{-1908\pi}{3} + \frac{816\pi}{3}\right] \bmod 2\pi = 0 \tag{31}$$

$$A_5 \cdot x_+ = \left[\frac{436\pi}{5} + \frac{-1030\pi}{5} + \frac{-1908\pi}{5} + \frac{816\pi}{5}\right] \bmod 2\pi = \frac{4\pi}{5} \tag{32}$$

$$A_7 \cdot x_+ = \left[\frac{436\pi}{7} + \frac{-1030\pi}{7} + \frac{-1908\pi}{7} + \frac{816\pi}{7}\right] \bmod 2\pi = \frac{8\pi}{7} \tag{33}$$

The resulting sums of the products are multiplied by $$\frac{m_i}{2\pi}$$

to convert from phase space back to integer residues, as shown in Equation 34.

$$\left(\pi \quad 0 \quad \frac{4\pi}{5} \quad \frac{8\pi}{7}\right) \times \left(\frac{2}{2\pi} \quad \frac{3}{2\pi} \quad \frac{5}{2\pi} \quad \frac{7}{2\pi}\right) = (1 \quad 0 \quad 2 \quad 4) \tag{34}$$

After converting to integer residues, the correction factors for signed addition may be added, which may be performed using digital electronics, as shown in Equation 35.

$$(1 \quad 0 \quad 2 \quad 4) + \left(\frac{M}{2} \quad 0 \quad 0 \quad 0\right) = (0 \quad 0 \quad 2 \quad 4) \tag{35}$$

After applying the correction factor for signed addition, the results may be converted to an integer using CRT, as shown in Equation 36.

$$(0 \times 105 \times 1 + 0 \times 1 \times 70 + 2 \times 3 \times 42 + 4 \times 4 \times 30) \bmod 210 = 102 \tag{36}$$

If the integer was obtained with an unsigned RNS, the integer would be 102. For a signed RNS, the final result is subtracted by $$\frac{M}{2} = 105$$

to get the integer $-0.1$. The result is a number that would be represented using 8 bits, but the RNS allows the number to be encoded by 3-bit residues.

The 8-bit result is exactly the result obtained when using ordinary arithmetic om Equation 37.

$$[2,-5,-9,4] \cdot [4,-2,1,-3] = 8 + 10 + (-9) + (-12) = -3 \tag{37}$$

In some embodiments, the matrix-vector multiplications described may be applied to general matrix-matrix multiplications (GEMM) or tensor multiplications. The GEMM operations may be performed in analog hardware with natural $2\pi$ winding in phase. A conversion between RNS and the integer values, and vice-versa, and storage of data may be performed using digital hardware, for example, the digital hardware 504 of FIG. 5, discussed in more detail below. In matrix-vector multiplication, such as example above, multiplication may comprise $O(N^2)$ operations for an N×N matrix and an N-long vector. A CRT operation that converts a vector of integer to corresponding residues and back may comprise an O(N) operation. In some embodiments, it may be beneficial to perform more expensive operations in the analog domain, for example, because the expensive operations may be performed in a widely parallel manner with a higher energy efficiency. In some embodiments, procedures may be performed using lookup tables in an FPGA or using logic gates in an application-specific integrated circuit (ASIC). In other embodiments, the same procedures are performed in digital computer hardware, such as a graphical processing unit (GPU) or a central processing unit (CPU). In some embodiments, operations are pipelined such that the throughput of a computing system comprising both analog hardware and digital hardware is not bottlenecked by either the analog hardware or the digital hardware.

Figure 10A:
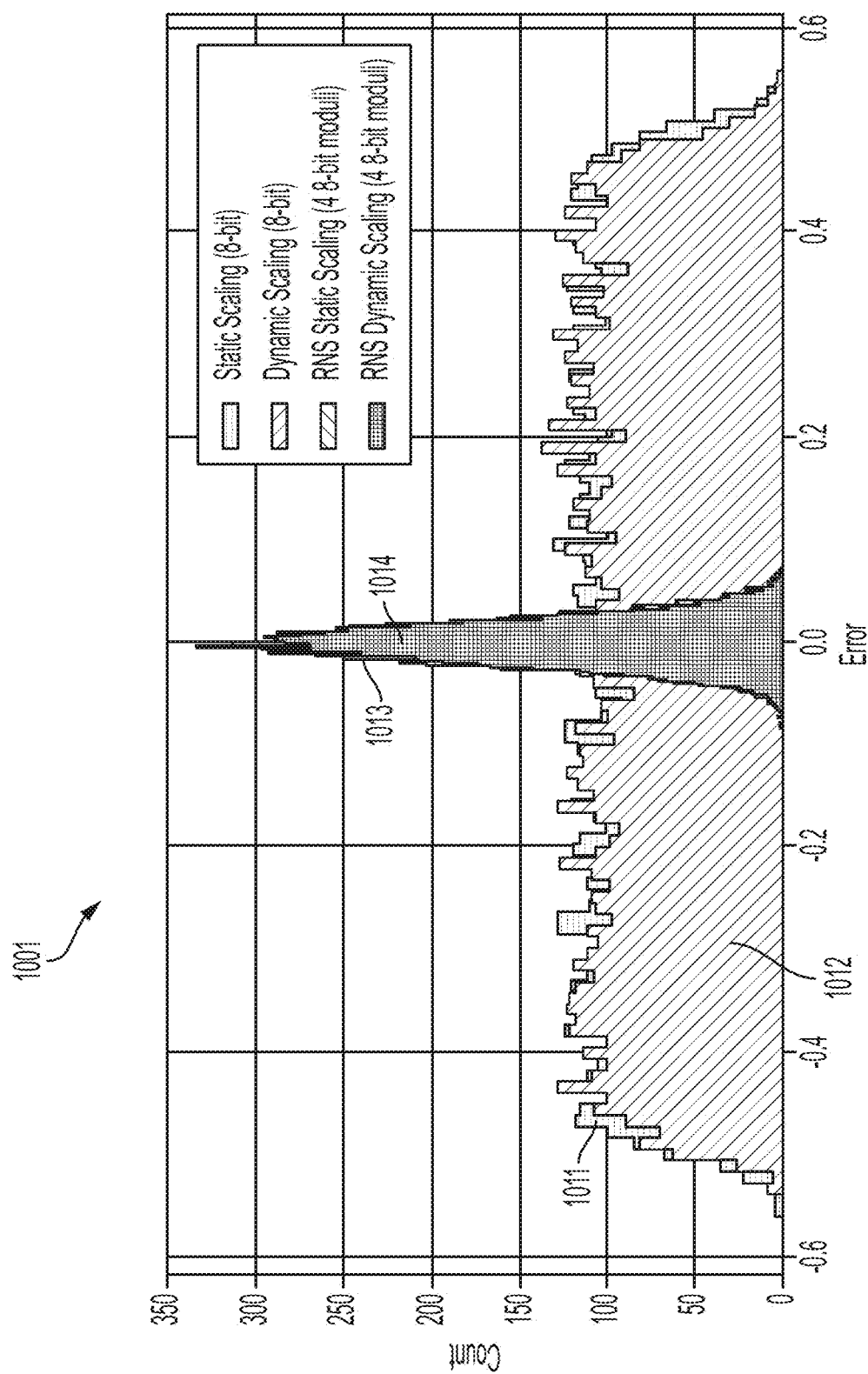
FIG. 10 shows errors that may be accrued for operations using analog hardware.
Figure 10B:
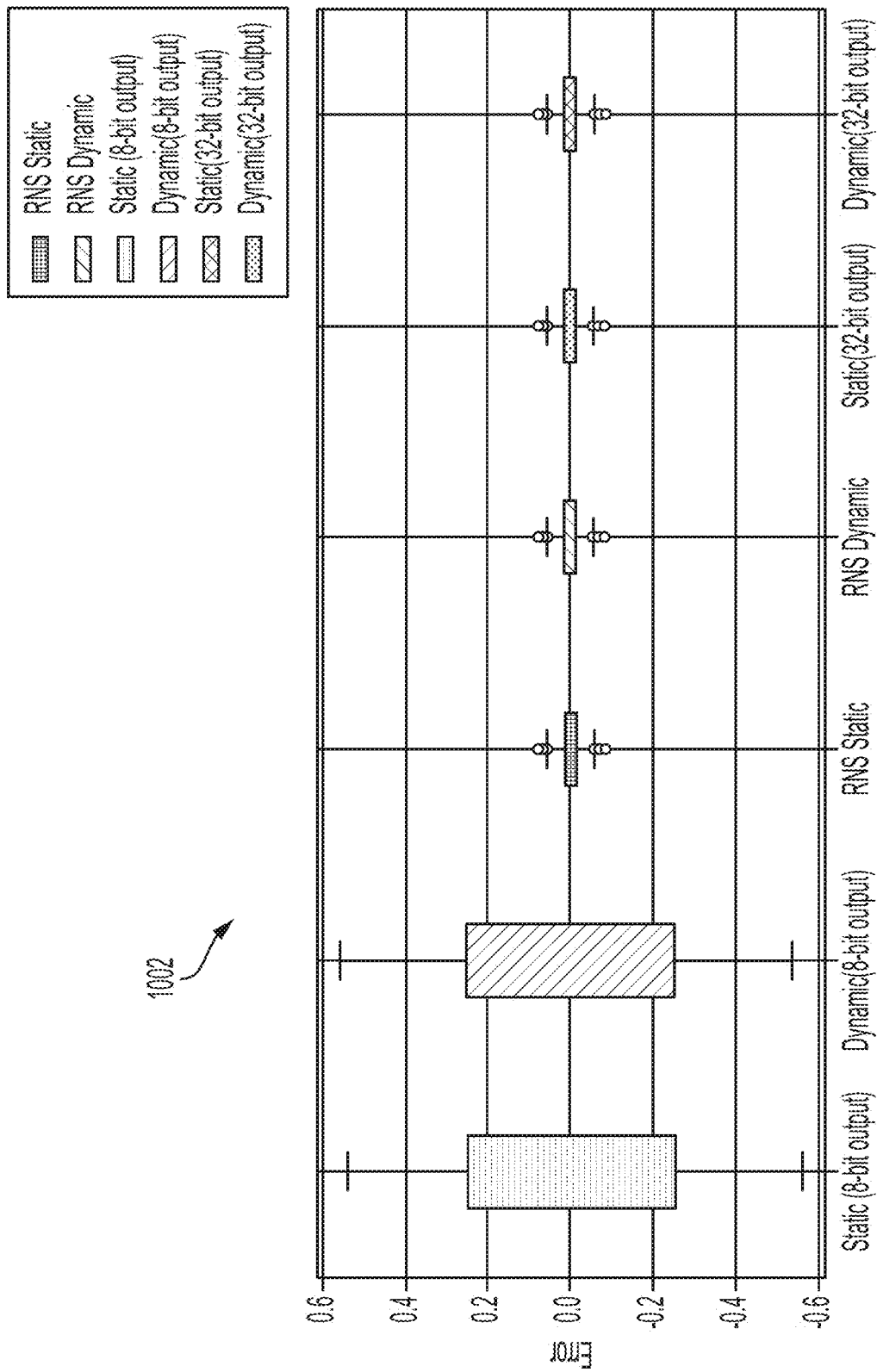

FIG. 10 includes plots 1001 and 1002 showing error that may be accrued from performing GEMM operations using analog hardware, according to one example. The GEMM operations in the example are between two randomly sampled FP32 matrices. The errors in the example are measured against multiplying the matrices digitally using FP32 precision. The multiplied matrices are first scaled such that numbers are between [−1, +1] in which this interval is quantized in a symmetric manner according to the bit precision of the inputs. In the example, the bit precision of the input is 8 bits, and therefore there are 255 values between −1 and +1 with 0 being one of the values. The example shows two scaling procedures, static and dynamic. In static scaling, the scale values are determined before runtime from a collection of similarly sampled matrices. In dynamic scaling, the scale values are determined during runtime by choosing the maximum absolute value entry of each matrix. The scales are stored in FP32. The results are then multiplied back with the corresponding FP32 scales to produce an FP32 output matrix, which is then compared against the results of the digital multiplication.

The results of the example illustrated in FIG. 10 show that performing GEMM operations in the analog hardware using an RNS with 8-bit moduli and 8-bit output ADCs may produce multiplications with errors comparable to GEMM operations using 8-bit inputs and 32-bit output ADCs. In plot 1001, bars 1012 correspond to Dynamic Scaling (8-bit) and bars 1011, which are illustrated behind bars 1012, correspond to Static Scaling (8-bit). In plot 1001, bars 1014 correspond to RNS Dynamic Scaling (4 8-bit moduli) and bars 1013, which are illustrated behind bars 1014, correspond to RNS Static Scaling (4 8-bit moduli). GEMM operations with 8-bit inputs and 8-bit output ADCs may produce significantly larger errors. The example shows low errors may be exhibited by RNS-based analog hardware. In some embodiments, the hardware may be used to perform high precision inference or training of a neural network. In an inference implementation, RNS-based matrix multipliers may be used to compute the output of a particular neural network layer. In a training implementation, RNS-based matrix multipliers may be used to compute the gradient of a particular neural network layer, for example, in backpropagation. In other embodiments, RNS-based matrix multipliers may perform general linear algebra operations, for example, the multipliers may perform QR decomposition, singular value decomposition, or inverting a matrix, with increased precision.

Aspects of the disclosure provide error detection and correction. A photonic processor may use added residues to provide error correction and/or detection. These additional residues form a redundant residue number system (RRNS) which comprises an error correction code. The additional residues may be labeled redundant because they do not extend the range of the number system. The redundant residues provide a range of invalid residue tuples that can be distinguished from correct representations, providing for error correction.

For example, an RNS may comprise n moduli $(m_1, m_2, \ldots, m_n)$. The range of numbers that can be represented by this set of moduli is $M=\Pi_{i=1}^{n} m_i$. This RNS may be extended to an RRNS with k redundant moduli $(m_{n+1}, m_{n+2}, \ldots, m_{n+k})$. The interval [0, M) is the information dynamic range of the RRNS code, and the interval [M, M·$M_R$) is the code dynamic range, where $M_R=\Pi_{i=1}^{k} m_{n+i}$. For the RRNS to work as an error correction code, the following condition is satisfied: $m_i > m_j$ for all $i > j$.

The code described above can be labeled as RRNS(n+k, n), which uses n+k residues to represent information that can be contained within n residues. This code may detect errors within up to k residues and correct errors within up to $\lfloor k/2 \rfloor$ residues. Additionally, the RRNS(n+k, n) code may correct errors within up to $t_c$ residues and simultaneously detect errors within up to $t_d$ residues if and only if $t_c + t_d \leq k$. For example, k≥2 additional redundant moduli may detect and correct an error in any one residue.

An example describing error detection and correction procedure using the RRNS code is provided. In the example, an error of an erroneous vector dot product A·x where A=[4, 3, 2, 1, 1] and x=[1, 2, 3, 4, 1] is computed and corrected, using n=3 moduli: $m_1=3$, $m_2=4$, $m_3=5$. Two redundant moduli, $m_4=7$ and $m_5=11$, are added forming the code RRNS(5, 3).

A desired result of y=A·x=21⇔(0 1 1 0 10). In the example, due to noise in the photonic processor, the third photonic rowline computing $r_3$ produces the integer output 3 instead of 1. In the example, $r_i$ is the i-th residue in the tuple. The readout result with the error is ŷ and has residue digits (0 1 3 0 10).

A photonic processor with error correction may recover an actual value of y (<M=$m_1 m_2 m_3$=60) from any three residue digits using the CRT if no error occurred. With five residue digits, ten possible combinations of integers may be produced from three out of the five residue digits, as shown in Equations 38-47. These ten combinations may be used to detect and correct errors.

$$(r_1, r_2, r_3),(0,1,3) \Leftrightarrow y_{123} = 33 \bmod 60 \quad (38)$$

$$(r_1, r_2, r_4) = (0,1,0) \Leftrightarrow y_{124} = 21 \bmod 84 \quad (39)$$

$$(r_1, r_2, r_5) = (0,1,10) \Leftrightarrow y_{125} = 21 \bmod 132 \quad (40)$$

$$(r_1, r_3, r_4) = (0,3,0) \Leftrightarrow y_{134} = 63 \bmod 105 \quad (41)$$

$$(r_1, r_3, r_5) = (0,3,10) \Leftrightarrow y_{135} = 153 \bmod 165 \quad (42)$$

$$(r_1, r_4, r_5) = (0,0,10) \Leftrightarrow y_{145} = 21 \bmod 231 \quad (43)$$

$$(r_2, r_3, r_4) = (1,3,0) \Leftrightarrow y_{234} = 133 \bmod 140 \quad (44)$$

$$(r_2, r_3, r_4) = (1,3,10) \Leftrightarrow y_{235} = 153 \bmod 220 \quad (45)$$

$$(r_2, r_3, r_5) = (1,0,10) \Leftrightarrow y_{245} = 21 \bmod 308 \quad (46)$$

$$(r_3, r_4, r_5) = (3,0,10) \Leftrightarrow y_{345} = 98 \bmod 385, \quad (47)$$

$y_{abc}$ represents a recovered result by running the CRT on residues $r_a$, $r_b$, $r_c$ with their corresponding moduli $m_a$, $m_b$, $m_c$. Five results numbered, in Equations 42, 44, 45, and 47 may be discarded because they extend beyond the information dynamic range [0, M)=[0, 60). Of the remaining five results, in Equations 38-40, 43, and 46 all but the very first result $y_{123}$, have the same result of 21. All these results were recovered using three residues which didn't include the erroneous residue $r_3$. The photonic processor may perform a vote among the results and recover a correct result of 21.

In some embodiments, a computing system may perform an error detection and correction procedure without CRT, which may be an expensive algorithm. In some embodiments, the computing system may instead use base extension algorithms to convert a set of residues, which represent a particular integer, to one or more residues to perform error correction and detection.

In some embodiments, error detection and correction operations are performed in digital hardware, for example, the digital hardware 504 of FIG. 5, discussed in more detail below. In some embodiments, the error detection and correction procedures are performed using lookup tables in an FPGA or using logic gates in an application-specific integrated circuit (ASIC). In other embodiments, the same procedures are performed in digital computer hardware, such as a graphical processing unit (GPU) or a central processing unit (CPU).

According to aspects of the disclosure, an error detection and correction process may be implemented simpler with additional constraints. For example, the RRNS(n+k, n) may also satisfy these constraints, 1. (48) $k \geq 2$
2. The product of any k−1 redundant moduli is larger than the greatest non-redundant moduli
3. (49) $M_R > m_i \cdot m_j$ ∀ $i,j \in [1,n]$, $i \neq j$
4. (50) $M_R \neq 2m_i m_j - n_1 m_i - n_2 m_j$ ∀ $i,j \in [1,n]$, $i \neq j$, $1 < n_1 < m_j - 1$, and $1 < n_2 < m_i - 1$
5. (51) $M_R > 2S_{N-R} + S_R$ The quantities $S_{N-R}$ and $S_R$ are defined in Equations 52 and 53. Because each non-redundant residue $r_i$ may be in error in exactly $m_i - 1$ ways, a sum of these is $S_{N-R}$, the total number of ways to have a single non-redundant residue in error. Similarly, $S_R$ is the number of ways a single redundant residue can be in error.

$$S_{N-R} = \sum_{i=1}^{n} (m_i - 1) \qquad (52)$$

$$S_R = \sum_{i=1}^{k} (m_{n+i} - 1) \qquad (53)$$

With the new constraints above, a photonic processor may implement an alternative error detection process.

First, the photonic processor may use base extension to recompute the residue with respect to each redundant modulus from the non-redundant residues. The base extension algorithm may be defined as follows. Given a number $y \Leftrightarrow (r_1 r_2 \ldots r_n)$, where $r_i = y \bmod m_i$, compute a new residue r* with respect to the modulus m* such that $r^* = y \bmod m^*$. This can be done by using CRT first to compute y from the residues $(r_1 r_2 \ldots r_n)$, or directly using alternative algorithms that do not materialize y. Then, the processor compares the computed residues with the redundant residues that resulted from the computation. If the residues match, the result is considered correct. Otherwise, the processor determines that there is an error. If there is one redundant residue mismatch, the processor may assume that mismatched redundant residue is incorrect and replace that residue with the recomputed redundant residue. If both redundant residues mismatch, the processor may assume one non-redundant residue is incorrect.

Where the processor assumes one non-redundant residue is incorrect, the non-redundant residue that is erroneous may be detected and then corrected. First, the original redundant residues are subtracted from the newly computed residues. The resulting tuple may then be used as an index into a pre-computed error correction table. The pre-computed error correction table may indicate which residue is in error, and may further indicate a correction factor to be added to the erroneous residue. An error correction table may include $2S_{N-R}$ valid entries. If the constructed index would reference an invalid table entry, then the processor may determine that a double-residue error may have occurred, which may not be corrected.

In an example, the error of an erroneous vector dot product A·x where A=[4, 3, 2, 1, 1] and x=[1, 2, 3, 4, 1] is computed and corrected, using n=3 moduli: $m_1=3$, $m_2=4$, $m_3=5$. Two redundant moduli, $m_4=7$ and $m_5=11$, are provided forming the code RRNS(5, 3).

The desired result of y=A·x=21⇔(0 1 1 0 10). In the example, due to noise in the photonic processor, the third photonic rowline computing $r_3$ produces the integer output 3 instead of 1. In the example, $r_i$ is the i-th residue in the tuple. In the example, the readout result is ŷ has residue digits (0 1 3 0 10).

First, the processor regenerates redundant residues from the non-redundant residues to check for errors. Using CRT, the processor may determine that the tuple (0 1 3) corresponds to the integer 33. Then the processor may determine that 33 mod 7=5 and 33 mod 11=0.

The processor may determine that the derived redundant residues (5, 0) do not match the residues stored in the code (0, 10), and determine that there is an error. The processor determines that both residues mismatch, and therefore the error is in one of the non-redundant residues. The processor may then compute the delta between each of the redundant residues: 5−0 mod 7=5 and 0−10 mod 11=1. The processor may look up the address (5, 1) the error correction table and determine that i=2 and $\Delta r_i=3$. The processor may then correct the residue by adding the correction factor with respect to the corresponding moduli, for example, $r_2' = (r_2 + \Delta r_2) \bmod m_2$. So (3+3) mod 5=1. The processor may then recover the correct code as (0 1 1 0 10). The exemplary correction table for the example in the 3, 4, 5, 7, 11 system is shown in Table I.

TABLE I

| $\Delta r_7$ | $\Delta r_{11}$ | i | $\Delta r_i$ |
| --- | --- | --- | --- |
| 1 | 2 | 0 | 2 |
| 1 | 3 | 2 | 4 |
| 1 | 4 | 1 | 1 |
| 1 | 7 | 2 | 3 |
| 2 | 4 | 0 | 1 |
| 2 | 8 | 1 | 2 |
| 2 | 10 | 2 | 2 |
| 3 | 1 | 1 | 3 |
| 3 | 2 | 2 | 1 |
| 4 | 9 | 2 | 4 |
| 4 | 10 | 1 | 1 |
| 5 | 1 | 2 | 3 |
| 5 | 3 | 1 | 2 |

TABLE I-continued

| Δr_7 | Δr_11 | i | Δr_i |
|---|---|---|---|
| 5 | 7 | 0 | 2 |
| 6 | 4 | 2 | 2 |
| 6 | 7 | 1 | 3 |
| 6 | 8 | 2 | 1 |
| 6 | 9 | 0 | 1 |

In some embodiments, such as the examples above, processing hardware may use the k additional residues and moduli to correct up to $\lfloor k/2 \rfloor$ errors. In other embodiments, hardware may first detect a number of residue errors. If there are $\leq \lfloor k/2 \rfloor$ errors, then the hardware may perform correction, for example, through voting. In some embodiments, if there are more than $\lfloor k/2 \rfloor$ errors, then the hardware may choose to repeat the matrix multiplications, instead of correcting errors. The hardware may continue to repeat the matrix multiplications as many times as tolerates according to a latency limit of the hardware. In another embodiment, when there are more than $\lfloor k/2 \rfloor$ errors, the hardware may also choose to perform maximum likelihood (ML) decoding. To perform ML decoding, the hardware may find an RRNS codeword closest to the residues measured in the system. In this case, the hardware provides an advantage because the multiplication was performed in analog hardware, where errors in the residues may affect the least significant bits. The ML decoding procedure may attempt to find a codeword where each individual residue is as close as possible to each measured residue. Other embodiments include combinations of the error detection and correction methods describe herein. The hardware may select a strategy depending on which error detection and correction logic units are available on the hardware and how much latency may be tolerated in the program or application according to a latency limit. Hardware that repeats calculations when there are more than $\lfloor k/2 \rfloor$ errors may incur higher latency when there are more errors observed in the computation.

Potential fields of use include high-performance computing systems and machine learning accelerators.

In some embodiments of a machine learning application, multiplication of an RNS-based matrix or tensor is performed using the analog hardware, which may be photonic or electronic, and whose phases provide the natural $2\pi$ winding described herein. Other operations such as nonlinearities, storage, and data permutation or copying may performed in the digital domain, for example, using digital hardware 504 of FIG. 5, discussed in more detail below. Some of these operations may be performed on residues directly. Operations that may be performed directly on residues include data storage, data permutation, data copying, and nonlinearities such as ReLU. In some embodiments, operations may convert residues back to a fixed-point or integer number or to a floating-point number. Operations that covert residues to these numbers may include nonlinearities such as Softmax.

Table II below shows exemplary results of the ResNet-50 deep convolutional neural network evaluated on the ImageNet dataset. In the example, the network is trained using a digital FP32 number representation. In the example, no quantization-aware training has been performed on the neural network. The example shows that digital FP32 accuracy and loss is maintained when the tensor multiplication is performed with an RNS using four 8-bit analog input DAC, weight DAC, and output ADC. Without the use of RNS, an 8-bit analog processor may have poor accuracy compared to the original 32-bit FP32 accuracy. The same result can be achieved without RNS when the output ADC is 32 bits. In some embodiments, a 32-bit ADC may operate with a clock frequency higher than one gigahertz.

TABLE II

| Calculations | Accuracy | Cross-entropy loss |
|---|---|---|
| 32-bit digital floating-point (FP32) | 76.1% | 0.962 |
| 8-bit analog input and weight with 8-bit output ADC | 20.7% | 4.460 |
| 8-bit analog input and weight with 32-bit output ADC | 76.1% | 0.963 |
| RNS with four 8-bit analog input and weight with 8-bit output ADC | 76.1% | 0.963 |

The disclosure further provides a residue number system (RNS) implemented along with a positional number system (PNS) within a photonic matrix accelerator. The inventors have recognized and appreciated that a RNS enables the composition of higher precision matrix-vector multiplications, precise up to $\log_2 (M)$ bits, where M is the product of all the moduli in the RNS. Applications, such as cryptography, may use an even larger number of bits than $\log_2 (M)$ bits, for example, up to 1024 bits. In photonic computing, or other analog computing applications, working with large moduli may present challenges because digital-to-analog converters and analog-to-digital converters may be limited to only 8 bits for those with rates beyond 1 GSamples/s (GSPS). In these applications, an RNS may be combined with a PNS to compose computation accurate to arbitrarily large bit widths.

According to aspects of the disclosure, there is provided a number system where a number X is represented by a set of D different digits. Each of the digits is represented by a set of residues that may represent all numbers from 0 to M−1. Computation on the set of residues may be performed using a photonic matrix accelerator, and computation on the D different digits may be performed using digital hardware. By using the combination of PNS and RNS on a photonic processor and digital hardware in combination, a system may represent numbers up to $D \cdot \log_2 (M)$ bits. Additional residues may be used to protect against overflow when working with the RNS within each digit.

The inventors have recognized and appreciated that using optical signals instead of, or in combination with, electrical signals, may overcome power limitations of conventional electronic computers. When a processor performs computations with optical signals, little to no power may be dissipated when the distance traveled by a light signal is increased, which may provide new topologies and processor layouts that may not be feasible using conventional electrical signals alone. Photonic processors may therefore provide improved efficiency performance compared with conventional electronic computers.

The inventors have further recognized and appreciated that an RNS may be used in photonic computing to enable production of fully-precise fixed point computation when input DACs and output ADCs have a same bit precision. In contrast, conventionally using a PNS alone may use an output ADC with a higher bit precision than an input DACs. For example, an RNS with n moduli ($m_1, m_2, \ldots, m_n$) may be used. A range of numbers that may be represented by this set of moduli is $M = \Pi_{i=1}^{n} m_i$. The value of the modulus $m_i$ may be selected based on the bit precision of the DACs and ADCs, which may be about 8 bits for ≥1 GSPS data converters.

Figure 5:
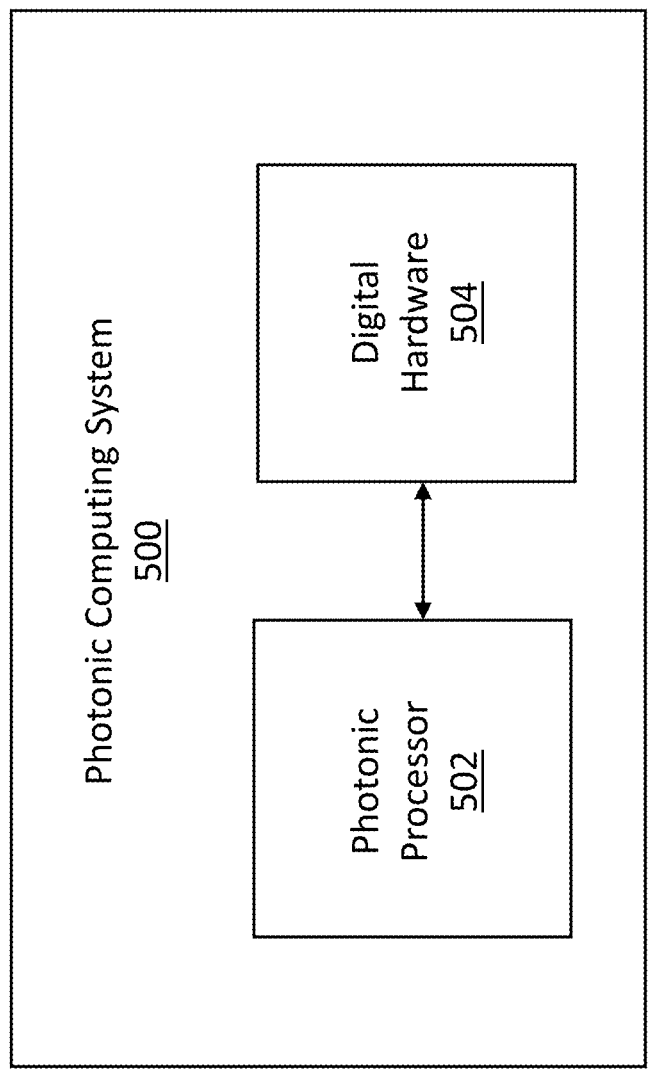
FIG. 5 illustrates a photonic computing system comprising a photonic processor and digital hardware.

FIG. 5 shows an exemplary photonic computing system 500 configured to use the RNS or a combination of RNS and PNS described herein. Photonic computing system 500 includes photonic processor 502 in communication with digital hardware 504. Photonic processor 502 may comprise photonic processor 400 described above, and may perform computation on the residues of the RNS. In some embodiments, the photonic processor 502 may include a combination of photonic and analog electronic components. The processor 502 may be configured to perform one or more matrix operations. The matrix operations may include a matrix multiplication. The analog components may include analog components designed to perform a matrix multiplication. In some embodiments, the processor 502 may be configured to perform matrix operations for training of a machine learning model, for example, a neural network, using the residues of the RNS. For example, the processor 502 may perform matrix operations for performing forward pass and backpropagation operations of a stochastic gradient training technique. In some embodiments, the processor 502 may be configured to perform matrix operations for performing inference using the trained machine learning model using the residues of the RNS. For example, the processor 502 may perform matrix operations for performing inference.

Digital hardware 504 may perform computation on the digits of the PNS. The digital hardware 504 may be configured to control operation of the hybrid processor of the photonic computing system 500. In some embodiments, the digital hardware may include components of computer system 800 describe below. For example, the digital hardware 504 may comprise a digital processor and memory. The memory may be configured to store software instructions that can be executed by the digital processor. The digital controller 504 may be configured to perform various operations by executing software instructions stored in the memory. In some embodiments, the digital hardware 504 may be configured to perform operations involved in converting between the residues in an RNS and integer and error detection and correction of the residues. Furthermore, the digital hardware 504 may also be configured to perform operations involved in using both RNS and PNS together.

The digital hardware 504 may be configured to scale input and output matrices to a matrix multiplication such that the matrices can be mapped to the residues in an RNS or to the positional residues in the combined RNS and PNS system. The input matrix may be converted from a digital floating-point representation to a fixed-point representation which may then be converted into a set of residues in an RNS or a set of positional residues in the combined RNS and PNS system. The output matrix may be converted from a residue representation to the fixed-point representation, which may be converted back to a digital floating-point representation. A digital floating-point representation may be a 16 bit floating-point representation (for example, "float16" or "FP16"), a 32 bit floating-point representation (for example, "float32" or "FP32"), a 64 bit floating-point representation (for example, "float64" or "FP64"), a 16 bit brain floating-point format (for example, "bfloat16"), a 32 bit brain floating-point format (for example, "bfloat32"), or another suitable floating-point format. In some embodiments, the digital hardware 504 may be configured to convert values from the residues to a first fixed-point representation and then to a second fixed-point representation. The first and second fixed-point representations may have different bit widths. In some embodiments, the digital hardware 504 may be configured to convert between residues in an RNS, or a combined RNS and PNS, and unums, for example, posits and/or valids.

In some embodiments, the processor 500 may be configured to determine an output of a matrix operation using tiling. Tiling may divide a matrix operation into multiple operations between smaller matrices. Tiling may allow reduction in size of the processor 500 by reducing the size of the analog processor 502. As an illustrative example, the processor 500 may use tiling to divide a matrix multiplication between two matrices into multiple multiplications between portions of each matrix. Each of the two matrices can be represented using the RNS alone or using a combination of the RNS and PNS. The processor 500 may be configured to perform the multiple operations in multiple passes. In such embodiments, an accumulation component in the digital hardware 504 may be configured to combine results obtained from operations performed using tiling into an output matrix.

Aspects of the disclosure provide a combination of residue and positional number systems. The disclosure provides a method with an increased the range of numbers that can be represented within the photonic computing system. In some embodiments, a photonic computing system may use a combination of a PNS and an RNS. In the combined PNS and RNS representation, a large non-negative integer number X may be represented into D different digits $x_d$, where $0 \le x_d < M$, with a radix M according to Equation 54.

$$X = \sum_{d=0}^{D-1} x_d M^d \qquad (54)$$

In Equation 54, X is an integer between 0 and $M^D - 1$. Each digit $x_d$ may be represented using n residues in a RNS, i.e., $(r_1, r_2, \ldots, r_n)$ where $r_i$ is the remainder of $x_d$ with respect to the modulus $m_i$. In one example, M may be approximately 32 bits, which can be composed of ≥4 moduli with 8-bit precision. With D=32, the number X may be as large as 1024 bits. A photonic computing system may further use this numeral representation for signed numbers.

$$X = \sum_{d=0}^{D-1} x_d M^d - M^D / 2 \qquad (55)$$

For example, in Equation 55, X is a signed integer between $[-M^D/2, M^D/2)$. Using a dot to divide the digits in two groups, fractions may be written in the positional system, such that the number X can be represented in Equation 56.

$$X = x_{D_I-1} x_{D_I-2} \ldots x_0 \cdot x_{-1} x_{-2} \ldots x_{-D_F} = \sum_{d=0}^{D_I-1} x_d M^d + \sum_{d=-1}^{-D_F} x_d M^d \qquad (56)$$

In Equation 56, $D = D_I + D_F$. Equation 56 is synonymous to dividing the value X with a scale factor $M^{D_F}$ that converts the integer-only X into a fixed-point X.

A photonic computing system may detect and prevent overflow using the combined number system described herein. The overflow may instead be propagated to a higher order digit in the PNS. The RNS may not prevent or detect any overflow. For example, a number greater than M−1 may have the same residues as one number between [0,M). As an example, the number 0 and the number M both of may have an all-zero codeword in the RNS.

The disclosure provides a method of detecting an overflow using extra moduli and residues and propagating them to the higher order digit within a PNS. A primary RNS representation may be extended with a secondary set of moduli. Every operation, for example, addition, multiplication, or dot product may be performed with both the primary and secondary residues and moduli. After every operation, the primary RNS representation may be kept for each digit, while the overflow of the primary representation may be carried over to the higher-order digit within the PNS.

According to one example, a non-negative integer X that is represented into D different digits $x_d$ ($0 \leq x_d < M_p$), with a radix $M_p$ is described by Equation 57.

$$X = \Sigma_{d=0}^{D-1} x_d M_p^d. \tag{57}$$

A primary RNS may use $n_p$-moduli $\{m_i\}$, where $i \in \{1, \ldots, n_p\}$ and each digit $x_d$ may be represented using $n_p$ residues. A secondary set of $n_s$-moduli $\{m_j\}$ may be used, where $j \in \{1, \ldots, n_s\}$, and $m_i \neq m_j$ for all values of i and j. Each operation may use $n_p + n_s$ residues such that the largest integer that may be represented by the residues is larger than the largest possible output of the operation. For example, $\Pi_{i=1}^{n_p} m_i \times \Pi_{j=1}^{n_s} m_j = M_p \times M_s = M$, where $M_s$ is sufficiently large such that M will be larger than the largest output of the operation, for example, addition, multiplication, or dot product. $M_p$ and $M_s$ may be provided to be co-prime with one another as the photonic computing system may use a multiplication inverse between the two numbers. The multiplicative inverse of a with respect to m may be described as $a^{-1}|_m$ and is defined as $a \times a^{-1} \equiv 1 \pmod{m}$.

An example for addition is described. For addition operations, a maximum value for each positional digit may be $2(M_p - 1) + 1$, and therefore $M_s \geq 3$ may be used, with the one being from carry over. In the example, D=3 and the primary RNS is constructed using $n_p=2$ moduli: $m_1=2$, $m_2=3$. The range of the primary RNS is $M_p = m_1 \times m_2 = 6$. The secondary modulus is $m_3=5$ and $n_s=1$.

In the example, addition of two numbers X=102 and Y=99 is performed. In result is Z=X+Y=211. The photonic computing system may first represent each number using a combination of the primary RNS and PNS according to Equations 58 and 59. The brackets and semicolons in Equations 58 and 59 represent the primary and secondary residues ($r_{p,1}, r_{p,2}, \ldots, r_{p,n_p}; r_{s,1}, \ldots, r_{s,n_s}$).

$$X = 2M_p^2 + 5M_p^1 + 0M_p^0 = (0,2;2)M_p^2 + (1,2;0)M_p^1 + (0,0;0)M_p^0 \tag{58}$$

$$Y = 2M_p^2 + 4M_p^1 + 3M_p^0 = (0,2;2)M_p^2 + (0,1;4)M_p^1 + (1,0;3)M_p^0 \tag{59}$$

The photonic computing system may perform addition of each digit order in parallel. The propagation may be performed from the lowest order digit to the higher order digits.

For the $M_p^0$ term (0, 0; 0)+(1, 0; 3)=(1, 0; 3). The system determines that there is no overflow no carry is performed. The output digit is $z_0$: (1, 0; 3).

For the $M_p^1$ term (1, 2; 0)+(0, 1; 4)=(1, 0; 4). This digit has an overflow, and thus a carry is computed. The digit $z_1$ may be decomposed into $z_1 = Q_1 M_p + R_1$, where $Q_1$ and $R_1$ are the quotient and the remainder of the digit $z_1$ with respect to the primary RNS. The quotient may subsequently be added to the higher order digit $z_2$ and the remainder may be kept at this order. Remainder and overflow detection may be performed by the photonic computing system. The remainder $R_1$ in the primary RNS comprises the tuple (1, 0) which are the residues to the primary moduli ($m_1=2$, $m_2=3$). In a traditional number system, this remainder is equal to 3, and its representation in terms of the secondary residue is 3, which is different to the secondary residue initially computed from just adding the two secondary residue operands. Using the residues, the photonic computing system may detect an overflow in a specific digit. The value of the remainder $R_1$ in terms of the secondary residues may be computed using a base extension algorithm. A number X may be represented in terms of the primary and secondary RNS denoted as $X|_p$ and $X|_s$, respectively. For example, $R_1|_s = \text{base\_extension\_p2s}(R_1|_p)$. p2s denotes primary to secondary. For this example, $R_1|_{p;s}=(1, 0; 3)$, and these are the residues that are to be recorded in position $M_p^1$. The quotient $Q_1$ may be computed in using both the primary and the secondary moduli, for example, $Q_1|_s = (z_1|_s - R_1|_s) \times$ is the multiplicative inverse of $M_p$ modulo $M_s$. For this inverse to be well-defined, $M_p$ may be coprime with $M_s$. This constraint is to be satisfied when providing the primary and secondary moduli. In this example, $M_p^{-1}|_s \equiv 1 \mod 5$, which may be used to obtain $Q_1|_s=(1)$. Using another base extension algorithm, the value of $Q_1$ may be represented in terms of the primary residues: $Q_1|_p = \text{base\_extension\_s2p}(Q_1|_s)$. s2p denotes secondary to primary. For this example, $Q_{1|p;s}=(1,1; 1)$. This quotient is to be propagated to the higher order digit. For output digit $z_1$ the residue $R_1=(1,0; 3)$.

For the $M_p^2$ term, in this example, $x_2|_{p;s}+y_2|_{p;s}=(0,2; 2)+(0,2; 2)=(0,1; 4)$. However, the quotient propagation from digit $z_1$ is to be added to this digit. Therefore, $z_2|_{p;s} = x_2|_{p;s} + y_2|_{p;s} + Q_1|_{p;s} = (0,1; 4)+(1,1; 1)=(1,2; 0)$. There is no overflow on this digit. The output digit is $z_2$: (1, 2; 0).

The result Z may be represented as: $Z=(1,2; 0) M_p^2 + (1,0; 3)M_p^1 + (1,0; 3)M_p^0$. The secondary residues and moduli may be used for computing the intermediate results. The secondary residues and moduli may not be stored in the final result. This gives: $Z=(1,2) M_p^2 + (1,0)M_p^1 + (1,0)M_p^0$. This result is the correct representation for a result that was computed in the positional number system $Z=5M_p^2+3M_p^1+3M_p^0=211$.

According to an example, multiplication between two numbers $X=\Sigma_{d=0}^{D-1} x_d M_p^d$ and $Y=\Sigma_{d=0}^{D-1} y_d M_p^d$ is performed. The result Z may be represented by: $Z=(\Sigma_{d=0}^{D-1} x_d M_p^d)(\Sigma_{d'=0}^{D-1} y_{d'} M_p^{d'}) = \Sigma_{k=0}^{2D} z_k M_p^k$. Table III below shows the number of multiplications that sum up to the digit number labeled.

TABLE III

| k | Number of multiplication terms to be summed |
|---|---|
| 0 | 1 |
| 1 | 2 |
| 2 | 3 |
| ... | ... |
| D − 2 | D − 1 |
| D − 1 | D |
| D | D − 1 |
| ... | ... |
| 2(D − 1) − 1 | 2 |
| 2(D − 1) | 1 |
| 2D − 1 | 0 |
| 2D | 0 |

There are a total of $D^2$ multiplications. From Table III, it may be shown why the multiplication of all the secondary moduli may be larger than about $DM_p$. For the term k=D, the output is a summation of D terms each smaller than $(M_p-1)^2$ and the propagated value from the lower order terms. The term $k=D-1$ may propagate $(D-1)$ terms, each smaller than $(M_p-1)$. All the other smaller terms may be smaller than $(M_p-1)$. The value propagated from a term of order k to another term of order k+1 is its quotient, and therefore may be a factor $(M_p-1)$ smaller. The RNS system may therefore be provided to represent all numbers between 0 and $D(M_p-1)^2+(D-1)(M_p-1)+M_p-1=DM_p(M_p-1)$. Since the primary moduli may represent numbers between 0 and $M_p-1$, the remaining $DM_p$ may be representable through the secondary moduli. The preceding condition may be used as a sufficient condition rather than a hard lower bound for the secondary moduli. The necessary and sufficient condition may be computed exactly using a worst-case propagation to upper digits.

In some embodiments, terms of order $k=2(D-1)+1=2D-1$ and $k=2(D-1)+2=2D$ may be obtained through carry propagation although no multiplication between the inputs X and Y will yield $M_p^k$ for these k values.

According to an example, multiplication is performed by a photonic computing system, For $D=2$, a primary RNS is constructed using $n_p=2$ moduli: $m_1=2$, $m_2=3$. The range of the primary RNS is $M_p=m_1\times m_2=6$. The secondary modulus is provided to be larger than $DM_p=12$. Accordingly, the RNS may have $m_3=13$ and $n_s=1$. The multiplicative inverse $M_p^{-1}|_s$ is 11. In the example, multiplication of two numbers $X=30$ and $Y=27$ is performed. The result is $Z=X\times Y=810$.

As with the addition example, the photonic computing system may first represent each number using a combination of the primary RNS and PNS as shown in Equations 60 and 61.

$$X=5M_p^1+0M_p^0=(1,2;5)M_p^1+(0,0;0)M_p^0, \text{ and} \tag{60}$$

$$Y=4M_p^1+3M_p^0=(0,1;4)M_p^1+(1,0;3)M_p^0. \tag{61}$$

Table IV shows the multiplications that are summed up to form the output digit.

TABLE IV

| Digit | Terms |
| --- | --- |
| $z_0$ | $x_0y_0$ |
| $z_1$ | $x_1y_0+x_0y_1$ + possible propagation from $z_0$ |
| $z_2$ | $x_1y_1$ + possible propagation from $z_1$ |
| $z_3$ | Possible propagation from $z_2$ |

Similar to the addition example, the multiply and accumulate operations for each output digit $z_k$ may be performed independently for each k. Carry-over propagation may be performed from the lowest-order digit to the highest-order digit.

For the $M_p^0$ term the photonic computing system may calculate $x_0y_0=(0,0;0)\cdot(1,0;3)=(0,0;0)$. This is zero and no propagation performed. The output $z_0$ digit is (0,0;0).

For the $M_p^1$ term, the photonic computing system may calculate $x_1y_0+x_0y_1=(1,2;5)\cdot(1,0;3)+(0,0;0)\cdot(0,1;4)=(1,0;2)$. The digit has an overflow and thus the carry is be computed. The number may be represented as $z_1=Q_1M_p+R_1$. For the remainder and overflow detection, from $R_1|_p=(1,0)$, the photonic computing system may compute $R_1|_s=\text{base\_extension\_p2s}(R_1|_p)=(3)$ to determine that this secondary residue is not identical to the secondary residue of $x_1y_0+x_0y_1$ and determine that there is an overflow. $R_1|_{p;s}=(1,0;3)$. Next, the photonic computing system may compute the quotient with $Q_1|_s=(z_1|_s-R_1|_s)\times M_p^{-1}|_s=(2-3)\times 11 \mod 13=-11 \mod 13=2 \mod 13=(2)$. The system may compute $Q_1|_p=\text{base\_extension\_s2p}(Q_1|_s)=(0, 2)$ to obtain $Q_1|_{p;s}=(0,2; 2)$. This quotient is to be propagated to the higher order digit. Output digit $z_1$: The residue $R_1=(1,0; 3)$.

For the $M_p^2$ term the system may calculate $x_1y_1=(1,2; 5)\cdot(0,1; 4)=(0,2; 7)$. Next, the system may add the propagated quotient $Q_1$ from the lower order term to obtain $z_2=x_1y_1+Q_1=(0,2; 7)+(0,2; 2)=(0,1; 9)$. This digit has an overflow. For remainder and overflow detection, $R_2|_p=(0,1)$ and $R_2|_s=\text{base\_extension\_p2s}(R_2|_p)=(4)$. This secondary residue is not identical to the residue 9 above so the system may determine that there is an overflow. $R_2|_{p;s}=(0,1; 4)$. $Q_2|_s=(z_2|_s-R_2|_s)=(9-4)\times 11 \mod 13=55 \mod 13=3 \mod 13=(3)$. $Q_2|_p=\text{base\_extension\_s2p}(Q_2|_s)=(1, 0)$. $Q_2|_{p;s}=(1,0; 3)$, which will be propagated to the higher digit. Output digit $z_2$: The residue $R_2=(0,1; 4)$.

For the $M_p^3$ term there is the propagated term from $z_2$. Output digit $z_3$: (1,0;3).

The system may remove all the secondary residues to obtain the final result: $Z|_p=(1,0) M_p^3+(0,1) M_p^2+(1,0) M_p^1+(0,0) M_p^0$.

According to an example, a dot product operation is performed. A dot product comprises a multiplication between elements of two vectors and an addition of the multiplied elements. For two vectors $\vec{X}=[X_1, X_2, \ldots, X_N]$ and $\vec{Y}=[Y_1, Y_2, \ldots, Y_N]$, the dot product gives $Z=\vec{X}\cdot\vec{Y}=\Sigma_{i=1}^N X_iY_i$. The dot product may be generalized to matrix-matrix multiplication and to tensor-tensor multiplication. A dot product may therefore represent a basic building block to a GEMM accelerator. The photonic computing system may perform a dot product with the combined positional and residual number system using the algorithms described above for addition and multiplication.

First, the system represent each $X_i$ and each $Y_i$ with their corresponding positional and residual representations, for example, $X_i=\Sigma_{d=0}^{D-1}x^{(i)}_dM_p^d$ and $Y_i=\Sigma_{d=0}^{D-1}y^{(i)}_dM_p^d$. Each $x^{(i)}_d$ and $y^{(i)}_d$ may be represented in terms of primary and secondary residues.

Then the system performs multiplication between the two elements to obtain partial results $Z'_i=X_iY_i=\Sigma_{d=0}^{2(D-1)}z'^{(i)}_dM_p^d$. Propagation may not be performed at this point. Each $z'^{(i)}_d$ may be represented in terms of their primary and secondary residues, and may have values larger than $M_p-1$.

Next, the system performs addition between all $Z'_i$ to obtain $Z=\Sigma_{i=1}^N Z'_i=\Sigma_{d=0}^{2(D-1)}(\Sigma_{i=1}^N z'^{(i)}_d)M_p^d$. At this point, overflow detections and digit propagations are performed to obtain the final answer $Z=\Sigma_{d=0}^{D_Z}z_dM_p^d$, where $D_Z=2D+\log_{M_p}(N)$. The $\log_{M_p}(N)$ term is due to the additions of N vector elements.

As described above for addition and multiplication, the system may use secondary residues and moduli selected to have $M_s$ of a size such that the overall number $M=M_pM_s$ is larger than the largest output of the operation.

The photonic computing system may perform overflow detection and carry propagation. The following pseudocode represents a method that may be executed by the system to perform the detection and propagation:

Input: $X=\Sigma_{d=0}^{D-1}x_dM_p^d$ and $Y=\Sigma_{d=0}^{D-1}y_dM_p^d$, where each digits $x_d$ and $y_d$ are represented in terms of their residues in the primary RNS, i.e., $x_d|_p$ and $y_d|_p$ respectively.

Output: $Z=\Sigma_{k=0}^{D_Z}z_kM_p^k$, where $Z=X\square Y$. The square $\square$ means any operation that is closed in the RNS, such as addition, multiplication, and dot product. The digit $z_k$ is also represented only in terms of its residues in the primary RNS, i.e., $Z_k|_p$.

The system may execute a method according to the following workflow.
1. Perform base extension algorithm from the primary RNS to the secondary RNS for all $x_d$ and $y_d$ to obtain $x_d|_{p;s}$ and $y_d|_{p;s}$.
2. Parallel for k from 0 to $D_Z$: (perform the basic calculation.)
   Compute $z'_k|_{p;s} \leftarrow \{x_d|_{p;s}\} \square \{y_d|_{p;s}\}$. For example, perform the computation $\square$ by using the digits $\{x_d|_{p;s}\}$ and $\{y_d|_{p;s}\}$. (May include more than just one digit of $x_d|_{p;s}$ and $y_d|_{p;s}$, in contrast with the multiplication and the dot-product cases.)
3. For k from 0 to $D_Z$: (perform overflow detection and propagate carries. $Q_{-1}|_{p;s}=0$.)
   $z'_k|_{p;s} += Q_{k-1}|_{p;s}$
   From $R_k|_p = z'_k|_p$, compute $R_k|s = $ base_extension_p2s$(R_k|_p)$.
   If $R_k|s = z'_k|s$: (no overflow.)
     Set $Q_k|_{p;s}=0$.
   else: (overflow is detected.)
     Compute $Q_k|_s = (z'_k|s - R_k|_s) \times M_p^{-1}|_s$.
     Compute $Q_k|_p = $ base_extension_s2p$(Q_k|_s)$ to obtain $Q_k|_{p;s}$.)
   Set $z_k|_p = R_k|_p$. (May not store the residues of the secondary moduli.)

The photonic computing system may implement the residue and positional number systems in a matrix accelerator. A residual photonic matrix accelerator may perform a single matrix-vector multiplication between a matrix and a vector for a single residue and modulus within a single clock cycle. For example, the processor 400 in FIG. 4 shows a schematic diagram of such an accelerator. Data may be encoded in the phases of light within each row-line using the phase shifters. The modulo $2\pi$ behavior of the phases of light can be tuned to encode the modulo $m_i$ for a specific modulus. The architecture operates on a row-line basis such that each row vector of the matrix A may independently multiplied, in a dot-product fashion, with an input column vector $\vec{x}$. As shown illustrated in FIG. 4, each row line corresponds to all the phase shifters that are connected in a single photonic waveguide. This architecture may advantageously perform dot-product procedures. The photonic computing system may augment such a photonic analog matrix accelerator with digital units to perform positional number system manipulations, which may include breaking down numbers into its positional and residue number representations, computing the remainders and the quotients, and propagating the quotients from the lower order digits upwards. By combining the photonic processor and the digital hardware, computation may be accelerated.

In addition to a photonic matrix accelerator, other matrix accelerator may accelerate matrix-vector multiplications, which, in the analog domain, may include an memristor or memory array, which includes SRAM, NAND, or FLASH memories, with modulo analog unit. For example, the array may include a modulo ADC device which samples a voltage V, performs the modulo operation in the analog domain to obtain V mod $\Phi$, and then quantizes the output with discretization $\delta$. The implementation described here may also be performed with a fully digital matrix accelerator configured to operate on residue numbers. For example, a systolic array where each multiply-accumulate (MAC) unit includes a modulo unit, and which performs the modulo operation on the result of the MAC may implement the number systems described herein. Operating on residue numbers may provide benefits for digital systems because the residue number system may limit bit precision used for the output or partial output registers, which may use modulo operator units.

A matrix accelerator may perform a method executing the following workflow. The overall system may operate on a primary set of $n_p$-moduli $\{m_i\}$, where $i \in \{1, \ldots, n_p\}$ and a secondary set of $n_s$-moduli $\{m_j\}$, where $j \in \{1, \ldots, n_s\}$. Each number X may be broken into D different digits in the positional number system (PNS), and each digit $x_d$ for $d \in \{0, \ldots, D-1\}$ may be primarily represented using the residues of the primary moduli using the residue number system (RNS). The radix of the PNS is $M_p = \Pi_{i=1}^{n_p} m_i$.

The accelerator may perform multiplication between a I×J matrix K and a vector $\vec{V}$ of length J. The elements of these objects may be denoted to be $K_{ij}$ and $V_j$. Each matrix and vector element may be digitally broken down into respective digits in the PNS, and each digit may be further broken down into corresponding residues of the primary moduli. The data are stored in the memory units using this primary representation. To perform the multiplication operation, the accelerator first extends the residues of each digit, for both the matrix and vector elements, to the residues of the secondary moduli using a base extension algorithm.

The accelerator performs the next operation in parallel between different moduli. The residual value of the digits of $K_{ij}$ are programmed into the matrix elements $A_{mn}$ and the residual value of the digits of $V_j$ are programmed into the vector elements of $x_n$ such that the output gives the residue of a specific digit of the temporary output. The output is temporary because no carries are propagated.

An example of matrix-vector multiplication programming is provided. An accelerator may perform multiplication $\vec{Z'} = K \cdot \vec{V}$ between the following 2×2 matrix of Table V and a length-2 vector: $[V_1^{(0)}M_p^{1} + V_0^{(0)}M_p^{0}, V_1^{(1)}M_p^{1} + V_0^{(1)}M_p^{0}]$.

TABLE V

| | |
|---|---|
| $K_1^{(00)}M_p^1 + K_0^{(00)}M_p^0$ | $K_1^{(01)}M_p^1 + K_0^{(01)}M_p^0$ |
| $K_1^{(10)}M_p^1 + K_0^{(10)}M_p^0$ | $K_1^{(11)}M_p^1 + K_0^{(11)}M_p^0$ |

The superscript index in parentheses corresponds to the matrix or vector index, and the subscript index refers to the digit order, for example, the power of $M_p$. The residue for a specific modulus is programmed for that digit of $K_k^{(ij)}$ and $V_k^{(j)}$.

Figure 6:
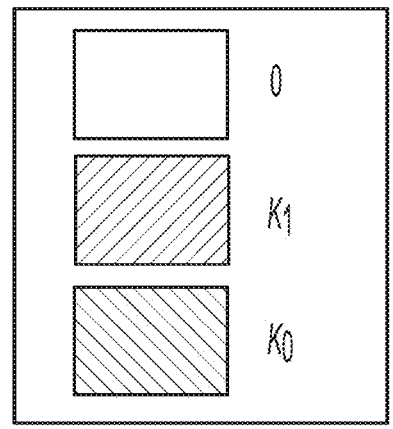
FIG. 6 illustrates Table VI.

Values programmed into the matrix accelerator are shown in Table VI in FIG. 6. In FIG. 6, shading is used to convey structure and repetition in the table. Values programmed into the vector are $[V_1^{(0)}, V_1^{(1)}, V_0^{(0)}, V_0^{(1)}]$. The output of this multiplication is $[Z'_2^{(0)}, Z'_2^{(1)}, Z'_1^{(0)}, Z'_1^{(1)}, Z'_0^{(0)}, Z'_0^{(1)}]$, which may be reorganized as $[\Sigma_{d=0}^{2} Z'_d^{(0)} M_p^{d}, \Sigma_{d=0}^{2} Z'_d^{(1)} M_p^{d}]$.

Such multiplication may be performed by any of the matrix accelerators mentioned above, as well as other accelerators not mentioned. The multiplication results of the moduli are collected and reorganized to obtain a temporary output vector: $\vec{Z'} = K \cdot \vec{V} = [\Sigma_{d=0}^{2(D-1)} Z'_d^{(0)} M_p^{d}, \Sigma_{d=0}^{2(D-1)} Z'_d^{(1)} M_p^{d}, \ldots, \Sigma_{d=0}^{2(D-1)} Z'_d^{(J)} M_p^{d}]$. Each digit $Z'_d^{(i)}$ contains overflow and is represented in terms of both the primary and secondary moduli. Superscript index denotes vector element and subscript index refers to the digit order, for example, the of $M_p$. Next, the system detects the overflows the propagates the carries upwards from the lowest order of $M_p^{d}$ to the highest order of $M_p^{d}$ to obtain the final result: $Z = [\Sigma_{d=0}^{D_Z} Z_d^{(0)} M_p^{d}, \Sigma_{d=0}^{D_Z} Z_d^{(1)} M_p^{d}, \ldots, \Sigma_{d=0}^{D_Z} Z_d^{(J)} M_p^{d}]$, with $D_Z = 2D + \log_{M_p}(J)$.

In some embodiments, each digit of $K_{ij}$ may not immediately be mapped to one entry of $A_{mn}$ because of the use of the PNS. Multiplication between two numbers represented in a PNS can be represented as a 1-dimensional convolution between the digits of the two numbers. In some embodiments, further optimizations may be implemented by the hardware. For example, a Fourier transformation, Winograd transformation, or other possible wavelet transformation, may first be performed on the digits of the matrix K and $\vec{V}$ into the Fourier domain. By the Convolution Theorem, the resulting digits in the Fourier domain may be multiplied directly using the matrix accelerator before another Fourier or Winograd transform is used to bring the results back to the original numerical domain. This Fourier or Winograd transform may be performed efficiently with fast Fourier transform (FFT).

In some embodiments, accelerators may implement parallelization. For example, there may be a total of $n_p+n_s$ photonic matrix accelerators, each operating within a single modulus. Operating accelerators in parallel may allow operations to be parallelized across the moduli, as operations are independent for each modulus. The parallel operation may provide a benefit that the mixed-signal converters, such as ADCs and DACs, used in each accelerator may be tailor fit for a specific modulus value. When parallelizing across the moduli is prohibitive, for example, due to area or power constraints, a single photonic matrix accelerator may be time-shared, where the accelerator operates on one modulus at a time. Time-sharing may allow for higher utilization of the same computing units, which may result in higher latency. In this configuration, DACs and ADCs may have a precision higher than or equal to the largest modulus.

In some embodiments, the pre-computational step of extending the residues of each digit from the primary moduli to secondary moduli may be parallelized. The pre-computational step may be independent for each digit of the matrix or vector element, which allows for the parallelization. The post-computational step of detecting the overflow and propagating the carries is independent for each output vector element. Accordingly, the post-computational step may also be parallelized.

In some embodiments, a computing system may be bottlenecked by digital units that detect possible overflow and propagate carries. For example, the digital units may operate only on the output vector (of length J), which may use O(J) operations that are independent and parallelizable for each output vector element. The matrix accelerator may perform the matrix-vector multiplication using O(I·J) operations. For example, a residual photonic matrix accelerator may perform a single matrix-vector multiplication within O(1) clock cycles. In some embodiments, the O(J) operations of the digital units are parallelized such that the digital units use O(1) clock cycles, and the matrix-vector multiplications may be pipelined with the post-processing steps of the combined RNS and PNS number system.

In some embodiments, the computing system may provide fault tolerance. Computation in the RNS domain may provide fault-tolerance by adding redundant moduli and residues, for example, as described above. The system may use R redundant moduli to detect and correct up to floor (R/2) errors in a computation. In some embodiments, computation in the PNS domain may provide fault-tolerance by implementing an error correction or detection code, for example, as described above.

In some embodiments, a computing system with a photonic matrix accelerator as described herein may be applied to homomorphically encrypted deep learning. Encrypted computing using fully homomorphic encryption (HE) may be used as a computing model for operating on data while maintaining data privacy. HE may be implemented when a client uses a public server to compute on sensitive data, but does not trust the server with the data. Such a scenario may occur when providing cloud services in the medical, financial, and advertising sectors. One example is a cloud-based electronic medical record (EMR) system that collects vital health information, computes important statistics based on the information, and recommends a course of medical treatment. To protect the privacy of the patient, data may be uploaded in an encrypted form, and the system may perform computations on the data without first decrypting the data. Privacy may be preserved on the cloud system using HE, which may be implemented compatible with deep neural networks. Using a HE-based deep learning model to provide data privacy, may be compute-intensive and may, for conventional deep learning models, be several orders of magnitude slower than operating on unencrypted data.

The inventors recognized and appreciated that limitations of conventional deep leaning models on encrypted data may forces HE-based deep learning models to be small, which limits practical usage HE-based deep learning models. The inventors have further recognized and appreciated that a photonic matrix accelerator may accelerate neural network computation. Due to the noise within some analog photonic computers, the architecture of those computers may not be suitable for HE-based deep learning computation, which may use precision ≥128 bits. The disclosure provides a combination of PNS and RNS which may be used to accelerate HE-based deep learning within the photonic matrix accelerator and overcome the noise issues present within other analog photonic computers.

Figure 7:
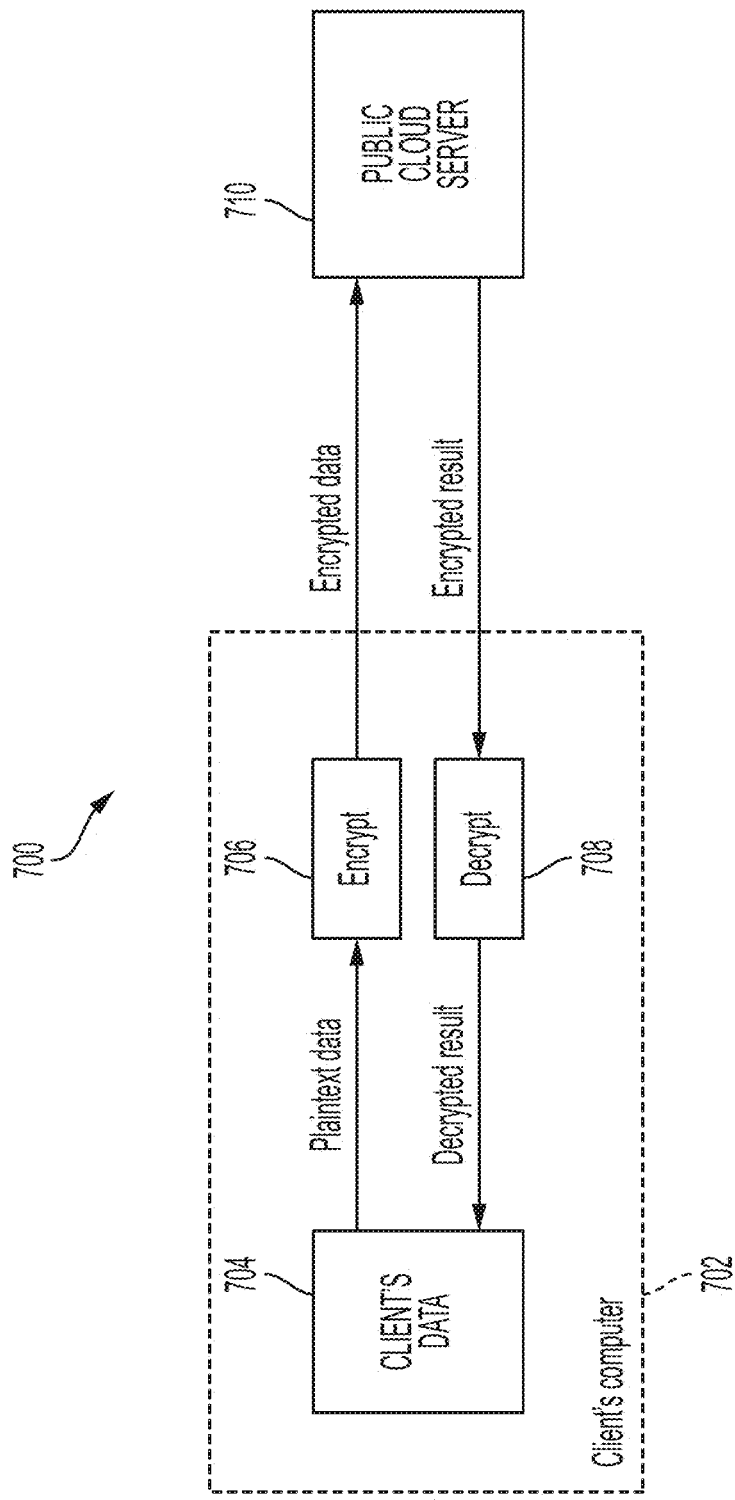
FIG. 7 illustrates a computing system implementing encryption.

FIG. 7. Shows a computing system 700 implementing homomorphic encryption. A client computer 702 stores client data 704. The client computer would like a public cloud to infer on their data using a neural network. The client computer is concerned about the privacy of their data and, therefore, encrypts the client data 704 homomorphically using encrypt module 706 and sends their data to the public cloud server 710, for example, as a ciphertext. The public cloud server 710 performs computations within internal servers. Once the neural network computation is completed, the public cloud server 710 returns the output, which is still encrypted, to the client computer 702. The client computer 702 decrypts the output within its own device using the decrypt module 708 and reads the unencrypted result to the client data 704.

In some embodiments, the system may implement a homomorphic encryption scheme such as ring-learning-with-error (RLWE), which encrypts data in polynomial rings and converts what would have been element-wise linear operations on unencrypted data into polynomial operations on the encrypted data. Within RLWE, linear operations consist of polynomial multiplication between two polynomials. For example, one row of a weight matrix and one column of an input matrix. Each polynomial in this scheme may be an element of a polynomial quotient ring $\mathbb{Z}_q[x]/(x^n+1)$. Each coefficient of the polynomial may be in $\mathbb{Z}_q$ for example, an integer between 0 and q−1, by taking the mod q. All polynomials may be of degree d<n which may be achieved by taking mod $(x^n+1)$, and $x^n \equiv -1 \mod (x^n+1)$. The values of and n may be large with >100 bits.

The server, such as server 710 may use a residual photonic accelerator with RNS and PNS, as described above, to increase the speed of multiplication between two polynomials $a(x)=a_0+a_1x+ \ldots +a_{n-1}x^{n-1}$ and $b(x)=b_0+b_1x+ \ldots +b_{n-1}x^{n-1}$. The accelerator may perform the operation as described above for matrix-vector multiplication, after framing the polynomials as vectors $\vec{a}=[a_0, a_1, \ldots, a_{n-1}]$ and $\vec{b}=[b_0, b_1, \ldots, b_{n-1}]$. Multiplication between two polynomials involves a 1-D convolution between the coefficients. The system may execute method performing an exemplary as follows.

First, the system represents each coefficient in terms of their RNS and PNS, such that $a_i=\Sigma_{d=0}^{D-1}a_d^{(i)}M_p^d$ and $b_i=\Sigma_{d=0}^{D-1}b_d^{(i)}M_p^d$. Multiplication between two PNS numbers is a 1-D convolution, in addition to the 1-D convolution from the polynomials. The digits $a_d^{(i)}$ and the digits $b_d^{(i)}$ are 2-D convolved with one another. This may use expensive processor resources. Therefore, this operation may be performed within a matrix accelerator to increase speed.

Next, the system programs the residues of the digits of $a_i$ into matrix elements of accelerator and the residues of the digits of $b_i$ into the vector elements of the accelerators, such that each element of the output vector corresponds to a specific digit of a specific polynomial power.

Next, within each output polynomial coefficient, the system performs overflow detection and carry propagation to obtain a polynomial $c(x)=a(x)\cdot b(x)=c_0+c_1x+ \ldots +c_{2(n-1)}x^{2(n-1)}$, where each coefficient $c_i$ is represented in terms of their nominal integer values, which may be larger than q.

Then, the system takes mod q of each of the coefficient $c_i$. In some embodiments, this step may be skipped, which may reduce the bit precision requirements of the following steps.

Next, the system computes the remainder of the polynomial by using the $x^n \equiv -1 \mod (x^n+1)$.

Last, the system may take the mod q of each of the coefficient again to obtain the output polynomial $c(x)=c_0+c_1+ \ldots +c_{n-1}x^{n-1}$, which is congruent to the polynomial obtained in the overflow detection and carry propagation step within the polynomial quotient ring.

In some embodiments, the system may implement optimization opportunities described above, such as using fast Fourier, Winograd, or other transforms, and implementing parallelization between independent element-wise operations.

Figure 8:
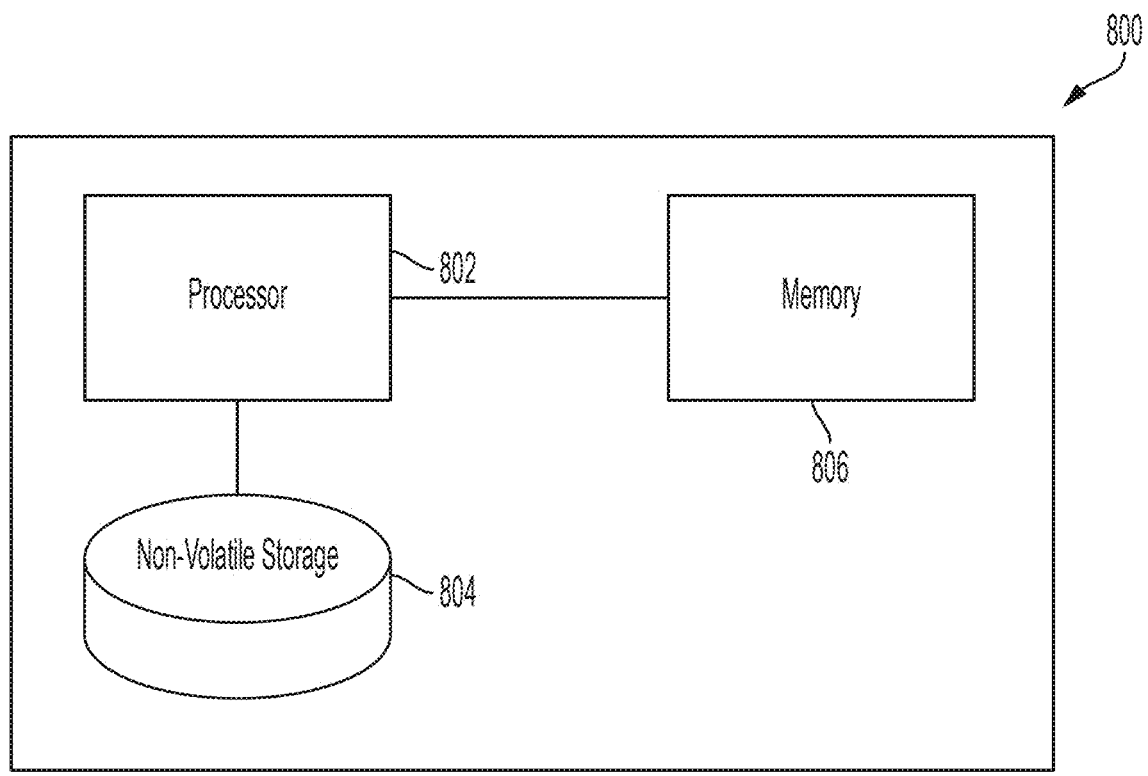
FIG. 8 illustrates a computer system.

FIG. 8 shows a block diagram of an example computer system 800 that may be used to implement some embodiments of the technology described herein. In some embodiments, system 800 may comprise digital hardware. The computing system 800 may include at least one computer hardware processors 802 and non-transitory computer-readable storage media, for example, memory 804 and at least one non-volatile storage devices 806. The at least one processor 802 may control writing data to and reading data from the memory 804 and the at least one non-volatile storage device 806. To perform any of the functionality described herein, the at least one processor 802 may execute one or more processor-executable instructions stored in one or more non-transitory computer-readable storage media, for example the memory 804, which may serve as non-transitory computer-readable storage media storing processor-executable instructions for execution by the at least one processor 802.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

A summary of other aspects is provided.

Aspect 1. A method comprising:
summing two values by modulating a phase of a single mode of a light signal and reading out a resulting output phase.

Aspect 2. The method according to aspect 1 wherein the modulating includes applying a voltage signal to a phase modulator.

Aspect 3. The method according to aspect 1 or 2 wherein the modulating is performed in a single-ended way.

Aspect 4. The method according to aspect 1 or 2 wherein the modulating is performed in a differential way.

Aspect 5. The method according to any preceding aspect wherein the reading out is performed with a coherent detector.

Aspect 6. A method comprising:
using a photonic linear processor to perform summation of values using phases of light.

Aspect 7. The method according to aspect 7 wherein the summation includes amplitude and weight modulated light used to drive a phase segmented coherent adder.

Aspect 8. A photonic linear processor including:
a laser light source producing input light;
a set of amplitude modulators receiving and modulating the input light;
a set of optical to electrical weight modulators which receive the modulated input light and produce electrical signals; and
a phase segmented coherent adder which receives and sums the electrical signals.

Aspect 9. The photonic linear processor according to aspect 8 wherein the phase segmented coherent adder includes a plurality of phase shifters coupled in series.

Aspect 10. The photonic linear processor according to aspect 9 wherein the phase segmented coherent adder further includes a coherent detector.

Aspect 11. The photonic linear processor according to any of aspects 8-10 wherein the processor is single-ended.

Aspect 12. The photonic linear processor according to any of aspects 8-10 wherein the processor is differential.

Aspect 13. The photonic linear processor according to any of aspects 8-12 wherein phase shifters in the phase segmented coherent adder phase shift light by $2\pi$ radians.

Aspect 14. The photonic linear processor according to aspect 13 wherein the summation is based on a residue number system through the phase shifting light by $2\pi$ radians.

Aspect 15. A method comprising:
modulating input light using a set of vector modulators;
producing electrical signals from the modulated input light using a set of weight modulators; and
summing the electrical signals using a phase segmented coherent adder.

Aspect 16. The method according to aspect 15 wherein the summing is based upon a residue number system by phase shifting light by $2\pi$ radians.

Aspect 17. The method according to aspect 16 wherein the residue number system includes signed numbers.

Aspect 18. The method according to aspect 16 wherein the residue number system includes unsigned numbers.

Aspect 19. The method according to any of aspects 15-18 further including performing error detection and/or correction by adding additional residues.

Aspect 20. A method of performing matrix-vector multiplications within a photonic matrix accelerator comprising:
combining a residue number system (RNS) with a positional number system (PNS) to improve computation accuracy.

Aspect 21. The method according to aspect 20 further including a method of detecting and preventing overflow.

Aspect 22. The method as claimed in claim 21 wherein the method of detecting includes using extra moduli and residues and propagating the extra moduli and residues to higher order digits within the PNS.

Aspect 23. A method of performing multiplication of a matrix with a vector in a residual photonic matrix accelerator in a single clock cycle comprising:
augmenting the photonic matrix accelerator with digital units that perform positional number manipulations by breaking down the numbers into positional a residue number representations;
computing remainders and quotients; and
propagating the quotients from lower order digits upwardly for computation acceleration.

Aspect 24. The method according to aspect 23 further including performing a wavelet transformation into the Fourier domain of digits of the matrix and/or vector for further optimization.

Aspect 25. The method according to aspect 23 or 24 further including time sharing a single photonic matrix accelerator operating on one modulus at a time.

Aspect 26. The method according to any of aspect 23-25 further including performing a pre-computational step of extending residues of each digit from a primary moduli to a secondary moduli.

Aspect 27. The method as claimed in any of aspect 23-26 further including the step of adding redundant moduli and/or residues for fault tolerance.

Aspect 28. A method of performing homomorphic encryption (HE) based deep learning within a photonic matrix accelerator comprising:
combining a residue number system (RNS) with a positional number system (PNS) to improve computation accuracy.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

Figure 9:
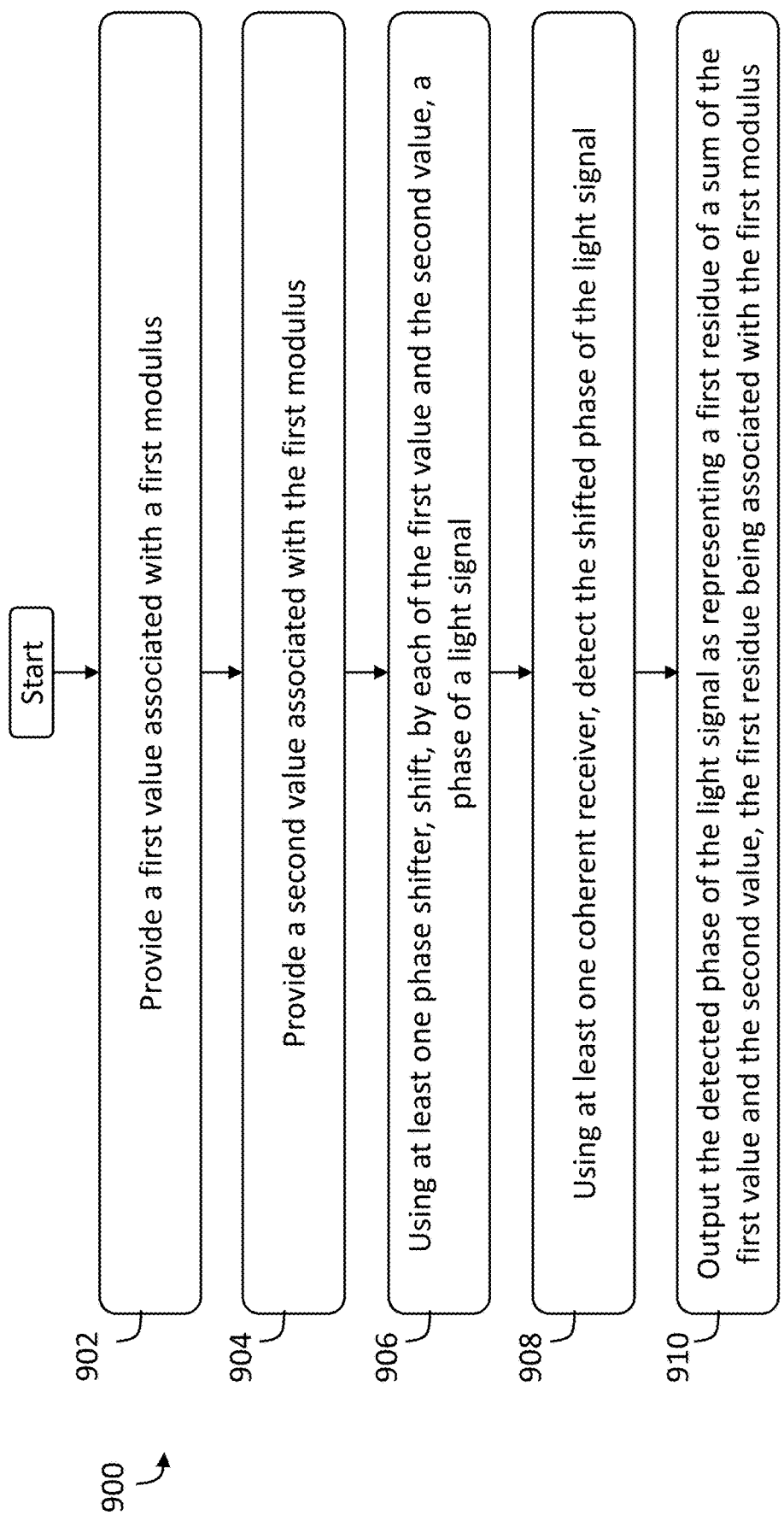
FIG. 9 illustrates a process flow of a method that may be performed by a photonic processor.

For example, FIG. 9 shows process 900. Process 900 may be executed by any of the photonic processors described herein, for example, photonic processor 400. Process 900 includes steps 902, step 904, step 906, step 908, and step 910. At step 902, the photonic processor provides a first value associated with a first modulus. At step 904, the photonic processor provides a second value associated with the first modulus. At step 906, the phonetic processor uses at least one phase shifter to shift, by each of the first value and the second value, a phase of a light signal. At step 908, the photonic processor uses at least one coherent receiver to detect the shifted phase of the light signal. At step 910, the photonic processor outputs the detected phase of the light signal as representing a first residue of a sum of the first value and the second value, the first residue being associated with the first modulus.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements);etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A photonic linear processor comprising:
an optical transmitter comprising at least one light source and at least one amplitude modulator, the optical transmitter configured to:
provide a first value associated with a first modulus; and
provide a second value associated with the first modulus;
at least one phase shifter configured to shift, by each of the first value and the second value, a phase of a first light signal; and
at least one coherent receiver configured to:
detect the shifted phase of the first light signal; and
output the detected phase of the first light signal as representing a first residue of a sum of the first value and the second value, the first residue being associated with
the first modulus, wherein:
the optical transmitter is further configured to:
provide a first vector comprising a first ordered sequence of values;
provide a second vector comprising a second ordered sequence of values of equal length as the first ordered sequence of values;
represent the first vector as a tuple of residue vectors, each residue vector of the tuple of residue vectors comprising a respective third ordered sequence of values of equal length as the first ordered sequence of values and each residue vector being associated with a respective modulus of a plurality of moduli of a residue number system (RNS), wherein the plurality of moduli includes the first modulus; and
for each residue vector of the tuple of residue vector, multiply corresponding values of the second ordered sequence of values and the respective third ordered sequence of values to produce a plurality of products, wherein the plurality of products for a first residue vector of the plurality of residue vectors includes the first value and the second value;
the at least one phase shifter is further configured to, for each residue vector of the tuple of residue vectors, shift, by each product of the plurality products, a phase of a light signal, wherein a light signal for the first residue vector comprises the first light signal;
the at least one coherent receiver is further configured to:
detect the shifted phase of each light signal; and
output the detected phases of each light signal as a tuple of residues, the tuple of residues representing a dot product of the first vector and the second vector, wherein one residue of the tuple comprises the first residue of the sum of the first value and the second value associated with the first modulus.

2. The photonic linear processor of claim 1, wherein:
the residue number system (RNS) comprises a redundant residue number system;
the redundant residue number system comprises the plurality of moduli and at least one redundant modulus; and
the photonic linear processor is further configured to, using the at least one redundant modulus:
detect an erroneous residue; and
correct the erroneous residue.

3. The photonic linear processor of claim 1, wherein the photonic linear processor is further configured to:
represent a number using a combination of the residue number system (RNS) and a positional number system (PNS), comprising:
representing the number using a plurality of digits of the PNS; and
representing each digit of the plurality of digits using a plurality of residues,
wherein each residue of the plurality of residues represents a remainder of a digit of the plurality of digits with respect to a modulus of the plurality of moduli of the RNS; and
obtain at least one of the first value and the second value using at least one residue of the plurality of residues.

4. The photonic linear processor of claim 3, wherein the photonic linear processor is further configured to:
detect an overflow of a first digit of the plurality of digits; and
propagate the overflow from the first digit to a second digit,
wherein the second digit has a higher order than the first digit.

5. The photonic linear processor of claim 1, wherein the at least one coherent receiver is configured with at least $\log_2(m_i)$ bits of precision, wherein $m_i$ is the first modulus.

6. The photonic linear processor of claim 1, further comprising an 8-bit analog-to-digital converter (ADC), wherein the at least one coherent receiver configured to output the detected phase to the ADC.

7. A photonic linear processor comprising:
an optical transmitter comprising at least one light source and at least one amplitude modulator, the optical transmitter configured to:
provide a first value associated with a first modulus; and
provide a second value associated with the first modulus;
at least one phase shifter configured to shift, by each of the first value and the second value, a phase of a first light signal; and
at least one coherent receiver configured to:
detect the shifted phase of the first light signal; and
output the detected phase of the first light signal as representing a first residue of a sum of the first value and the second value, the first residue being associated with the first modulus,
wherein the photonic linear processor is further configured to:
represent a number using a combination of a residue number system (RNS) and a positional number system (PNS), comprising:
representing the number using a plurality of digits of the PNS; and
representing each digit of the plurality of digits using a plurality of residues,
wherein each residue of the plurality of residues represents a remainder of a digit of the plurality of digits with respect to a modulus of a plurality of moduli of the RNS; and
obtain at least one of the first value and the second value using at least one residue of the plurality of residues;
detect an overflow of a first digit of the plurality of digits; and
propagate the overflow from the first digit to a second digit, wherein the second digit has a higher order than the first digit, wherein:
the plurality of moduli comprises a first set of moduli;
the first set of moduli is configured to represent each digit of the plurality of digits;
the plurality of moduli further comprises a second set of moduli;
each modulus of the second set of moduli is different than each modulus of the first set of moduli;
the second set of moduli includes the first modulus; and
detecting the overflow of the first digit comprises detecting the overflow of the first digit using the outputted detected phase of the light signal representing the residue of the sum of the first value and the second value, associated with the first modulus.

8. The photonic linear processor of claim 7, wherein:
the optical transmitter is further configured to:
provide a first vector comprising a first ordered sequence of values;
provide a second vector comprising a second ordered sequence of values of equal length as the first ordered sequence of values;
represent the first vector as a tuple of residue vectors, each residue vector of the tuple of residue vectors comprising a respective third ordered sequence of values of equal length as the first ordered sequence of values and each residue vector being associated with a respective modulus of the plurality of moduli of the residue number system (RNS), wherein the plurality of moduli includes the first modulus; and
for each residue vector of the tuple of residue vector, multiply corresponding values of the second ordered sequence of values and the respective third ordered sequence of values to produce a plurality of products, wherein the plurality of products for a first residue vector of the plurality of residue vectors includes the first value and the second value;
the at least one phase shifter is further configured to, for each residue vector of the tuple of residue vectors, shift, by each product of the plurality products, a phase of a light signal, wherein a light signal for the first residue vector comprises the first light signal;
the at least one coherent receiver is further configured to:
detect the shifted phase of each light signal; and
output the detected phases of each light signal as a tuple of residues, the tuple of residues representing a dot product of the first vector and the second vector, wherein one residue of the tuple comprises the first residue of the sum of the first value and the second value associated with the first modulus.

9. A method of performing summation of values using phases of light, the method comprising:
providing a first value associated with a first modulus;
providing a second value associated with the first modulus;
using at least one phase shifter, shifting, by each of the first value and the second value, a phase of a light signal;
using at least one coherent receiver, detecting the shifted phase of the light signal;
outputting the detected phase of the light signal as representing a first residue of a sum of the first value and the second value, the first residue being associated with the first modulus;
providing a first vector comprising a first ordered sequence of values;
providing a second vector comprising a second ordered sequence of values of equal length as the first ordered sequence of values;
representing the first vector as a tuple of residue vectors, each residue vector of the tuple of residue vectors comprising a respective third ordered sequence of values of equal length as the first ordered sequence of values and each residue vector being associated with a respective modulus of a plurality of moduli of a residue number system (RNS), wherein the plurality of moduli includes the first modulus;
for each residue vector of the tuple of residue vectors:
multiplying corresponding values of the second ordered sequence of values and the respective third ordered sequence of values to produce a plurality of products, wherein the plurality of products for a first residue vector of the plurality of residue vectors includes the first value and the second value;
using at least one phase shifter, shifting, by each product of the plurality products, a phase of a light signal, wherein a light signal for the first residue vector comprises the first light signal; and
using at least one coherent receiver, detecting the shifted phase of each light signal; and
outputting the detected phases of each light signal as a tuple of residues, the tuple of residues representing a dot product of the first vector and the second vector, wherein one residue of the tuple comprises the first residue of the sum of the first value and the second value associated with the first modulus.

10. The method of claim 9, further comprising converting the first vector to the tuple of residue vectors using constant factors of $2\pi/m_i$, wherein $m_i$ comprises the respective modulus.

11. The method of claim 9, further comprising converting the result vector from phase space to a tuple of integer residues using constant factors of $2\pi/m_i$, wherein $m_i$ comprises the respective modulus.

12. The method of claim 11, further comprising converting the tuple of integer residues to an integer.

13. The method of claim 12 wherein converting the tuple of integer residues to the integer comprises converting the tuple of integer residues to the integer using Chinese Remainder Theorem.

14. The method of claim 13, further comprising, to perform signed addition:
for integer residues of the tuple of integer residues associated with an even modulus, adding a correction factor of M/2 to produce corrected integer residues;
converting the tuple of corrected integer residues to an integer; and
subtracting the correction factor of M/2 from the integer, wherein M comprises the range of the residue number system (RNS), comprising the product of each modulus of the plurality of moduli.

15. The method of claim 9, wherein:
the residue number system (RNS) comprises a redundant residue number system;
the redundant residue number system comprises the plurality of moduli and at least one redundant modulus; and
the method further comprises, using the at least one redundant modulus:
detecting an erroneous residue; and
correcting the erroneous residue.

16. The method of claim 9, further comprising:
representing a number using a combination of the residue number system (RNS) and a positional number system (PNS), comprising:
representing the number using a plurality of digits of the PNS; and
representing each digit of the plurality of digits using a plurality of residues,
wherein each residue of the plurality of residues represents a remainder of a digit of the plurality of digits with respect to a modulus of the plurality of moduli of the RNS; and
obtaining at least one of the first value and the second value using at least one residue of the plurality of residues.

17. The method of claim 16, further comprising:
detecting an overflow of a first digit of the plurality of digits; and
propagating the overflow from the first digit to a second digit,
wherein the second digit has a higher order than the first digit.

18. The method of claim 9, further comprising, receiving, at a cloud server, from a client device, encrypted client data;
obtaining the first value and the second value using the encrypted client data; and
outputting, to the client device, from the cloud server, an encrypted result based on the detected phase.

19. A method of performing summation of values using phases of light, the method comprising:
providing a first value associated with a first modulus;
providing a second value associated with the first modulus;
using at least one phase shifter, shifting, by each of the first value and the second value, a phase of a light signal;
using at least one coherent receiver, detecting the shifted phase of the light signal; and
outputting the detected phase of the light signal as representing a first residue of a sum of the first value and the second value, the first residue being associated with the first modulus;
representing a number using a combination of a residue number system (RNS) and a positional number system (PNS), comprising:
representing the number using a plurality of digits of the PNS; and
representing each digit of the plurality of digits using a plurality of residues,
wherein each residue of the plurality of residues represents a remainder of a digit of the plurality of digits with respect to a modulus of a plurality of moduli of the RNS;
obtaining at least one of the first value and the second value using at least one residue of the plurality of residues;
detecting an overflow of a first digit of the plurality of digits; and
propagating the overflow from the first digit to a second digit, wherein the second digit has a higher order than the first digit,
wherein:
the plurality of moduli comprises a first set of moduli;
the first set of moduli is configured to represent each digit of the plurality of digits;
the plurality of moduli further comprises a second set of moduli;
each modulus of the second set of moduli is different than each modulus of the first set of moduli;
the second set of moduli includes the first modulus; and
detecting the overflow of the first digit comprises detecting the overflow of the first digit using the outputted detected phase of the light signal representing the residue of the sum of the first value and the second value, associated with the first modulus.

20. The method of claim 19, further comprising:
providing a first vector comprising a first ordered sequence of values;
providing a second vector comprising a second ordered sequence of values of equal length as the first ordered sequence of values;
representing the first vector as a tuple of residue vectors, each residue vector of the tuple of residue vectors comprising a respective third ordered sequence of values of equal length as the first ordered sequence of values and each residue vector being associated with a respective modulus of the plurality of moduli of the residue number system (RNS), wherein the plurality of moduli includes the first modulus;
for each residue vector of the tuple of residue vectors:
multiplying corresponding values of the second ordered sequence of values and the respective third ordered sequence of values to produce a plurality of products, wherein the plurality of products for a first residue vector of the plurality of residue vectors includes the first value and the second value;
using at least one phase shifter, shifting, by each product of the plurality products, a phase of a light signal, wherein a light signal for the first residue vector comprises the first light signal; and
using at least one coherent receiver, detecting the shifted phase of each light signal; and
outputting the detected phases of each light signal as a tuple of residues, the tuple of residues representing a dot product of the first vector and the second vector, wherein one residue of the tuple comprises the first residue of the sum of the first value and the second value associated with the first modulus.

* * * * *